US011897279B2

(12) United States Patent
Yoshizawa et al.

(10) Patent No.: US 11,897,279 B2
(45) Date of Patent: Feb. 13, 2024

(54) ENVELOPE PROCESSING APPARATUS AND IMAGE FORMING SYSTEM

(71) Applicants: Shingo Yoshizawa, Kanagawa (JP); Michitaka Suzuki, Kanagawa (JP); Nobuyoshi Suzuki, Tokyo (JP); Yuusuke Shibasaki, Tokyo (JP); Shinji Asami, Tokyo (JP); Takahiro Matsuda, Kanagawa (JP); Kazuyoshi Matsuo, Miyagi (JP); Makoto Hidaka, Tokyo (JP); Akira Kunieda, Tokyo (JP); Takahiro Watanabe, Kanagawa (JP); Takuya Morinaga, Tokyo (JP)

(72) Inventors: Shingo Yoshizawa, Kanagawa (JP); Michitaka Suzuki, Kanagawa (JP); Nobuyoshi Suzuki, Tokyo (JP); Yuusuke Shibasaki, Tokyo (JP); Shinji Asami, Tokyo (JP); Takahiro Matsuda, Kanagawa (JP); Kazuyoshi Matsuo, Miyagi (JP); Makoto Hidaka, Tokyo (JP); Akira Kunieda, Tokyo (JP); Takahiro Watanabe, Kanagawa (JP); Takuya Morinaga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/721,516

(22) Filed: Apr. 15, 2022

(65) Prior Publication Data

US 2022/0363088 A1 Nov. 17, 2022

(30) Foreign Application Priority Data

May 11, 2021 (JP) ................................ 2021-080485
Mar. 7, 2022 (JP) ................................ 2022-034516

(51) Int. Cl.
*B43M 3/04* (2006.01)
*B43M 5/04* (2006.01)
*G03G 15/00* (2006.01)

(52) U.S. Cl.
CPC ............ *B43M 3/045* (2013.01); *B43M 5/042* (2013.01); *G03G 15/6582* (2013.01)

(58) Field of Classification Search
CPC ........ B43M 3/045; B43M 5/02; B43M 3/042; G03G 15/6582
(Continued)

(56) References Cited

U.S. PATENT DOCUMENTS

2004/0172923 A1 9/2004 Rawlinson
2004/0250517 A1* 12/2004 Hsieh ..................... B43M 3/045 53/284.3

(Continued)

FOREIGN PATENT DOCUMENTS

CA 2666205 A1 11/2009
CN 1551840 A 12/2004

(Continued)

OTHER PUBLICATIONS

Partial European Search Report dated Sep. 9, 2022 issued in corresponding European Appln. No. 22168784.1.

(Continued)

*Primary Examiner* — Jacob A Smith
(74) *Attorney, Agent, or Firm* — Harness, Dickey & Pierce, P.L.C.

(57) ABSTRACT

An envelope processing apparatus for enclosing an enclosure into an envelope conveyed to an enclosing position includes a conveyance roller that conveys the envelope to the enclosing position. A first envelope length calculator calculates a first envelope length of the envelope in an envelope conveyance direction in which the envelope is
(Continued)

conveyed in a close state in which a flap of the envelope closes. A flap opener opens the flap while the conveyance roller conveys the envelope. A second envelope length calculator calculates a second envelope length of the envelope in the envelope conveyance direction in an open state in which the flap opens. A controller calculates a flap length of the flap in the envelope conveyance direction based on the first envelope length and the second envelope length. The controller controls enclosing of the enclosure into the envelope based on the flap length.

20 Claims, 23 Drawing Sheets

(58) Field of Classification Search
USPC .................................................... 53/569, 255
See application file for complete search history.

(56) References Cited

U.S. PATENT DOCUMENTS

| | | | | |
|---|---|---|---|---|
| 2005/0218579 | A1 | 10/2005 | Yamada et al. | |
| 2007/0069448 | A1* | 3/2007 | Honda | B65H 31/10 271/145 |
| 2009/0039593 | A1 | 2/2009 | Kikkawa et al. | |
| 2010/0258994 | A1 | 10/2010 | Kikkawa et al. | |
| 2011/0103921 | A1 | 5/2011 | Suzuki et al. | |
| 2011/0130260 | A1 | 6/2011 | Kikkawa et al. | |
| 2011/0277418 | A1 | 11/2011 | Kunieda et al. | |
| 2012/0192529 | A1* | 8/2012 | Sytema | B65H 39/043 53/469 |
| 2012/0260606 | A1* | 10/2012 | Noguchi | G03G 15/6594 53/255 |
| 2012/0267846 | A1 | 10/2012 | Nakada et al. | |
| 2013/0011219 | A1 | 1/2013 | Musha et al. | |
| 2015/0031520 | A1 | 1/2015 | Nakada et al. | |
| 2015/0036172 | A1 | 2/2015 | Tachibana | |
| 2015/0091246 | A1 | 4/2015 | Yoshida et al. | |
| 2016/0115000 | A1 | 4/2016 | Sugiyama et al. | |
| 2016/0340145 | A1 | 11/2016 | Kunieda et al. | |
| 2019/0284012 | A1 | 9/2019 | Yoneyama et al. | |
| 2019/0292002 | A1 | 9/2019 | Takahashi | |
| 2019/0299667 | A1* | 10/2019 | Furumido | B65H 31/36 |
| 2020/0307944 | A1 | 10/2020 | Shibasaki et al. | |
| 2020/0341414 | A1 | 10/2020 | Watanabe et al. | |
| 2020/0407187 | A1 | 12/2020 | Hidaka et al. | |
| 2021/0279538 | A1* | 9/2021 | Suzuki | B65H 31/10 |
| 2021/0316955 | A1 | 10/2021 | Shibasaki et al. | |
| 2021/0325808 | A1 | 10/2021 | Morinaga et al. | |
| 2021/0347589 | A1 | 11/2021 | Suzuki et al. | |

FOREIGN PATENT DOCUMENTS

| | | | |
|---|---|---|---|
| CN | 104339884 | A | 2/2015 |
| CN | 110294349 | A | 10/2019 |
| JP | 7-061407 | | 3/1995 |
| JP | H09-052294 | A | 2/1997 |
| JP | 2009/298563 | A | 12/2009 |
| JP | 2011-256013 | | 12/2011 |
| JP | 2012-013914 | A | 1/2012 |
| JP | 2013-082544 | | 5/2013 |
| JP | 2013-119454 | A | 6/2013 |
| JP | 2014-162603 | A | 9/2014 |
| JP | 2016-027960 | | 2/2016 |
| JP | 2016-030676 | A | 3/2016 |
| JP | 2018-001572 | | 1/2018 |

OTHER PUBLICATIONS

Chinese Office Action dated May 20, 2023 issued in corresponding Chinese Appln. No. CN202210447531.X.

Chinese Office Action dated Nov. 28, 2023 issued in corresponding Chinese Patent Application No. CN 202210447531.X.

* cited by examiner

ENVELOPE PROCESSING APPARATUS AND IMAGE FORMING SYSTEM

CROSS-REFERENCE TO RELATED APPLICATIONS

This patent application is based on and claims priority pursuant to 35 U.S.C. § 119(a) to Japanese Patent Application Nos. 2021-080485, filed on May 11, 2021, and 2022-034516, filed on Mar. 7, 2022, in the Japan Patent Office, the entire disclosure of each of which is hereby incorporated by reference herein.

BACKGROUND

Technical Field

Exemplary aspects of the present disclosure relate to an envelope processing apparatus and an image forming system, and more particularly, to an envelope processing apparatus and an image forming system incorporating the envelope processing apparatus.

Discussion of the Background Art

Related-art enclosing apparatuses for enclosing an enclosure into an envelope automatically include an envelope processing apparatus that automatically encloses a folded sheet, serving as an enclosure that is produced by performing predetermined folding on a sheet serving as a medium, into an envelope and seals the envelope. A related-art image forming system interlocks an image forming apparatus with a folding apparatus. The image forming apparatus forms an image on a sheet. The folding apparatus folds the sheet formed with the image. The image forming system automatically encloses the folded sheet formed with the image into an envelope and seals the envelope.

SUMMARY

This specification describes below an envelope processing apparatus. In one embodiment, the envelope processing apparatus for enclosing an enclosure into an envelope conveyed to an enclosing position includes a conveyance roller that conveys the envelope to the enclosing position. A first envelope length calculator calculates a first envelope length of the envelope in an envelope conveyance direction in which the envelope is conveyed in a close state in which a flap of the envelope closes. A flap opener opens the flap while the conveyance roller conveys the envelope. A second envelope length calculator calculates a second envelope length of the envelope in the envelope conveyance direction in an open state in which the flap opens. A controller calculates a flap length of the flap in the envelope conveyance direction based on the first envelope length and the second envelope length. The controller controls enclosing of the enclosure into the envelope based on the flap length.

This specification further describes an improved image forming system. In one embodiment, the image forming system includes an image forming apparatus that forms an image on a medium and the envelope processing apparatus described above that encloses the medium as an enclosure sent from the image forming apparatus into an envelope.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
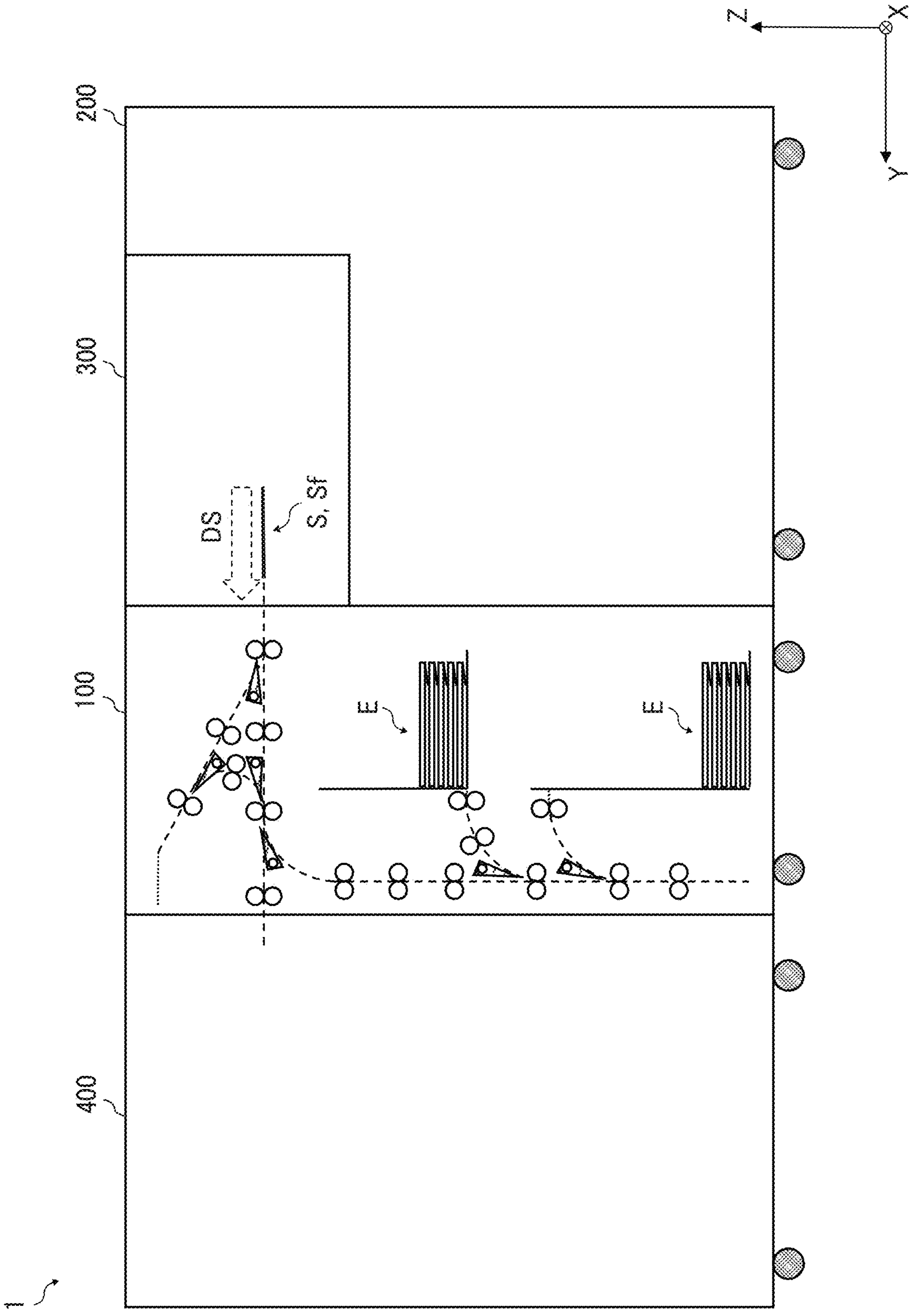
FIG. 1 is a front cross-sectional view of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

A description is provided of a construction of an image forming system according to an embodiment of the present disclosure.

FIG. 1 is a front cross-sectional view of a print system 1 as one example of the image forming system. The print system 1 includes an image forming apparatus 200, a folding apparatus 300 serving as a sheet processing apparatus, an envelope processing apparatus 100 according to an embodiment of the present disclosure, and a post-processing apparatus 400.

The image forming apparatus 200 is one example of an apparatus that forms an image on a sheet S serving as a medium by a predetermined image forming method and ejects the sheet S. The folding apparatus 300 performs predetermined folding on the sheet S serving as the medium formed with the image and ejects the sheet S to the envelope processing apparatus 100. Alternatively, the folding apparatus 300 may not fold the sheet S and may eject the sheet S to the envelope processing apparatus 100. The image forming apparatus 200 includes a controller that outputs an instruction to fold or not to fold the sheet S based on information input by a user of the print system 1. Alternatively, the folding apparatus 300 may include a controller that receives the instruction based on the information input by the user of the print system 1.

The envelope processing apparatus 100 performs envelope processing to enclose an enclosure into an envelope E and seal the envelope E automatically. The enclosure is ejected by an upstream apparatus (e.g., the image forming apparatus 200 or the folding apparatus 300) disposed upstream from the envelope processing apparatus 100 in a sheet conveyance direction DS in which the sheet S is conveyed into the envelope processing apparatus 100. The enclosure defines the sheet S conveyed into the envelope processing apparatus 100 from the upstream apparatus disposed upstream from the envelope processing apparatus 100 in the sheet conveyance direction DS or a folded sheet Sf that is produced by folding the sheet S and is conveyed into the envelope processing apparatus 100. Alternatively, the envelope processing apparatus 100 may not perform the envelope processing on the sheet S or the folded sheet Sf and may eject the sheet S or the folded sheet Sf to a downstream apparatus disposed downstream from the envelope processing apparatus 100 in the sheet conveyance direction DS.

The post-processing apparatus 400 performs post-processing, such as stapling, instructed via the controller on the sheet S or the folded sheet Sf ejected from the folding apparatus 300 or the envelope processing apparatus 100 disposed upstream from the post-processing apparatus 400 in the sheet conveyance direction DS.

The envelope processing apparatus 100 encloses the folded sheet Sf performed with folding into the envelope E in a proper orientation. The envelope processing apparatus 100 determines whether or not a conveyance direction of the folded sheet Sf is to be reversed so that an address or the like printed on the folded sheet Sf serving as an enclosure overlaps a transparent window ew illustrated in FIG. 21B formed in the envelope E in advance. If the envelope processing apparatus 100 determines that the conveyance direction of the folded sheet Sf is to be reversed, a conveying mechanism of the envelope processing apparatus 100 reverses the folded sheet Sf by using a conveyance path disposed upstream from an enclosing position where the folded sheet Sf is enclosed into the envelope E in the sheet conveyance direction DS, and then conveys the folded sheet Sf to the enclosing position. Details of control processes for reversing and conveying the folded sheet Sf are described below. Similarly, the envelope processing apparatus 100 also inserts the sheet S, serving as an enclosure that is not folded, into the envelope E.

A description is provided of coordinate axes referred to in descriptions of embodiments of the present disclosure.

As illustrated in FIG. 1, Y-axis defines an axis that is parallel to a placement face on which the print system 1 is placed and is extended in an arrangement direction in which the apparatuses (e.g., the image forming apparatus 200, the folding apparatus 300, the envelope processing apparatus 100, and the post-processing apparatus 400) that construct the print system 1 are arranged. A direction indicated with an arrow of Y-axis defines a positive Y-direction. A direction opposite to the positive Y-direction defines a negative Y-direction. The sheet S bearing the image formed by the image forming apparatus 200 is conveyed in the positive Y-direction. Thereafter, the sheet S is conveyed to the folding apparatus 300, the envelope processing apparatus 100, and the post-processing apparatus 400 that are disposed downstream from the image forming apparatus 200 in the positive Y-direction.

Similarly, X-axis defines an axis that is parallel to the placement face on which the print system 1 is placed and is extended in a front-rear direction of the print system 1. A direction indicated with an arrow of X-axis defines a positive X-direction. A direction opposite to the positive X-direction defines a negative X-direction.

Z-axis defines an axis that is perpendicular to X-axis and Y-axis and is extended in a height direction of the print system 1. A direction indicated with an arrow of Z-axis defines a positive Z-direction. A direction opposite to the positive Z-direction defines a negative Z-direction.

If drawings referred to in descriptions below are also attached with coordinate axes similar to the coordinate axes described above, directions of the coordinate axes are also defined as described above.

The sheet S bearing the image formed by the image forming apparatus 200 is ejected in the positive Y-direction. Thereafter, the sheet S is conveyed to the folding apparatus 300, the envelope processing apparatus 100, and the post-processing apparatus 400 that are disposed downstream from the image forming apparatus 200 in the positive Y-direction. Hence, the positive Y-direction is equivalent to the sheet conveyance direction DS. However, although the sheet S enters the envelope processing apparatus 100 in the positive Y-direction, the sheet S or the folded sheet Sf is conveyed in a Z-direction when the sheet S or the folded sheet Sf is inserted into the envelope E.

For example, in the envelope processing apparatus 100 of the print system 1, the envelope E is conveyed in the Z-direction. The envelope E is conveyed to the enclosing position in the positive Z-direction. The envelope E is conveyed from the enclosing position to a sealing position where the envelope E is sealed in the negative Z-direction.

Figure 2A:
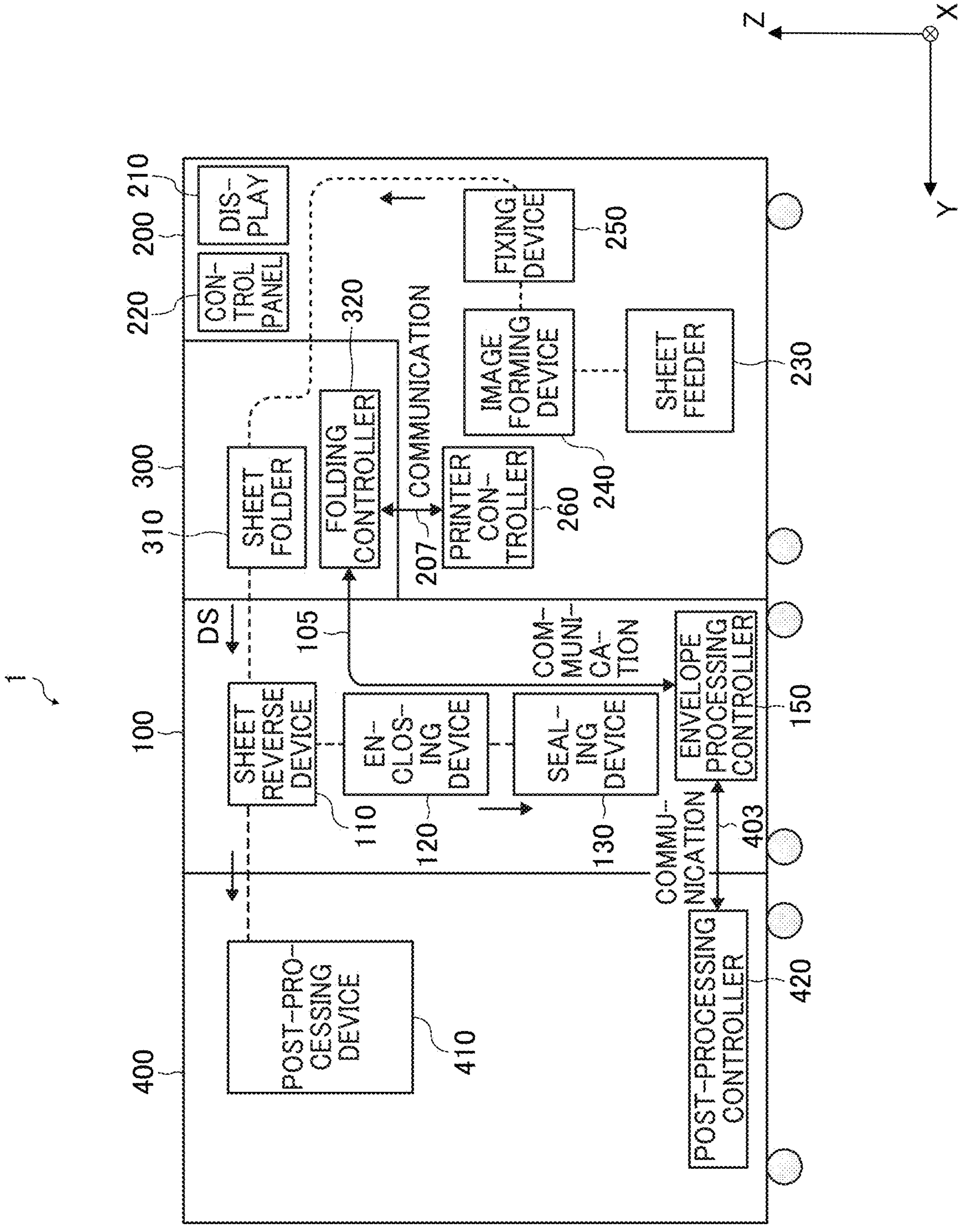
FIG. 2A is a block diagram of the image forming system depicted in FIG. 1, illustrating a control configuration thereof.
Figure 2B:
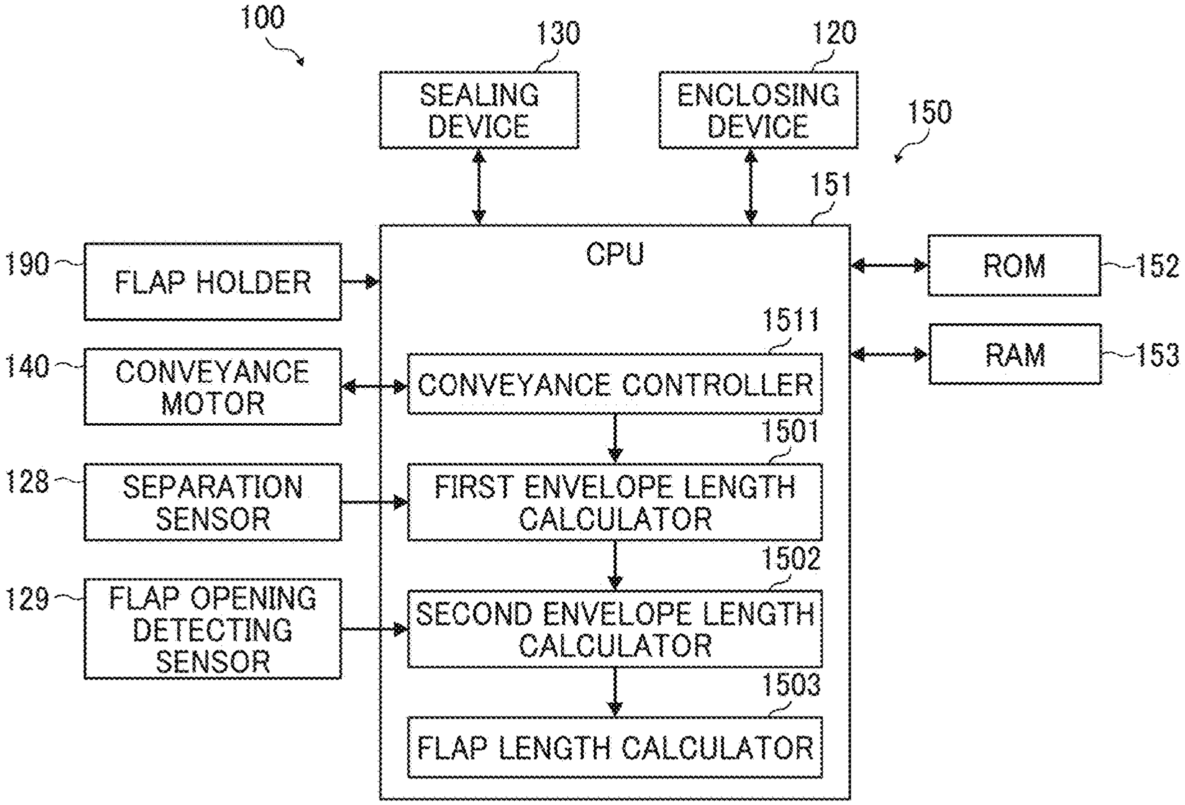
FIG. 2B is a block diagram of an envelope processing apparatus incorporated in the image forming system depicted in FIG. 2A.

Referring to FIGS. 2A and 2B, a description is provided of functional blocks of an entirety of the print system 1.

In a description below, an enclosure serving as a medium conveyed and inserted into the envelope E is the folded sheet Sf that bears an image formed by the image forming apparatus 200 and is treated with predetermined folding by the folding apparatus 300. FIG. 2A illustrates a motion path (e.g., a conveyance path) of the folded sheet Sf with a broken line. FIG. 2A illustrates a channel used for sending and receiving a signal between the functional blocks with a solid line. FIG. 2A illustrates a motion path (e.g., a conveyance path) of the sheet S with the broken line also.

For example, the image forming apparatus 200 forms the image on the sheet S by general electrophotographic processes. The image forming apparatus 200 includes a display 210, a control panel 220, a sheet feeder 230, an image forming device 240, a fixing device 250, and a printer controller 260.

The display 210 displays information to the user, such as a status of each function and an operation to be specified by the user. The control panel 220 is equivalent to an operation interface with which the user performs settings such as a setting for specifying an operating mode and a number of prints and a setting for reversing the sheet S when the envelope processing apparatus 100 inserts the sheet S or the folded sheet Sf into the envelope E. The sheet feeder 230 includes a sheet feeding mechanism that stocks the sheets S and separates and feeds the sheets S one by one. The image forming device 240 forms a latent image on a photoconductor, develops the latent image into an image (e.g., a toner image), and transfers the image onto the sheet S. The fixing device 250 fixes the image transferred onto the sheet S thereon. The printer controller 260 controls operations of the functional blocks described above.

The folding apparatus 300 includes a sheet folder 310 and a folding controller 320. The sheet folder 310 folds the sheet S conveyed from the image forming apparatus 200 with a folding type, that is, by a folding method, specified by the printer controller 260 of the image forming apparatus 200 via a communication line 207. The folding controller 320 controls an entirety of the folding apparatus 300. The folding controller 320 also controls communication with the printer controller 260 and an envelope processing controller 150 that is disposed downstream from the folding controller 320 in the sheet conveyance direction DS of the sheet S and is coupled with the folding controller 320. Alternatively, the sheet S may be conveyed to the envelope processing apparatus 100 without being folded by the sheet folder 310.

The sheet folder 310 may selectively employ a plurality of types of detailed constructions. A state of the folded sheet Sf after being folded by the sheet folder 310 may vary depending on the type of the construction. Specifically, at a predetermined position in an enclosing device 120 described below, a leading end of the folded sheet Sf in an enclosing direction in which the folded sheet Sf enters the envelope E may vary depending on the type of folding. Even with an identical folding, the leading end of the folded sheet Sf in the sheet conveyance direction DS may change places with a trailing end of the folded sheet Sf in the sheet conveyance direction DS according to an interior configuration of the sheet folder 310.

A description is provided of a construction of the envelope processing apparatus 100.

The envelope processing apparatus 100 includes a sheet reverse device 110, the enclosing device 120, a sealing device 130, and the envelope processing controller 150.

The sheet reverse device 110 performs predetermined processing on the folded sheet Sf conveyed from the sheet folder 310. The predetermined processing defines conveyance of the folding sheet Sf, that corresponds to a control mode (e.g., a type of folding, a position on a print face of the folded sheet Sf, and the like) instructed to the envelope processing controller 150 from the folding controller 320 via a communication line 105. The sheet reverse device 110 performs conveyance of the folded sheet Sf downstream in the sheet conveyance direction DS, reversing of the folded sheet Sf to change places of the leading end and the trailing end of the folded sheet Sf in the sheet conveyance direction DS, and the like. Conveyance and reversing of the folded sheet Sf convey the folded sheet Sf to the enclosing device 120 or the post-processing apparatus 400.

The enclosing device 120 includes a mechanism that moves the envelope E to the enclosing position where the folded sheet Sf conveyed from the sheet reverse device 110 is inserted into the envelope E, causes the envelope E to wait at the predetermined position, and presses and inserts the folded sheet Sf serving as the enclosure into the envelope E that waits. The enclosing device 120 further includes a mechanism that opens a flap ef illustrated in FIG. so that a mouth Ip (e.g., an opening) of the envelope E opens before the envelope E reaches the predetermined position. The enclosing device 120 further includes a mechanism used to calculate a length of the envelope E (e.g., a dimension in the enclosing direction in which the enclosure is inserted into the envelope E) and a length of the flap ef before the envelope E reaches the predetermined position. The mechanisms insert the folded sheet Sf into the envelope E in a state in which the envelope E is held at the predetermined position and the mouth Ip of the envelope E opens. The mechanisms insert the folded sheet Sf into the envelope E that varies in type and size properly.

Figure 3:
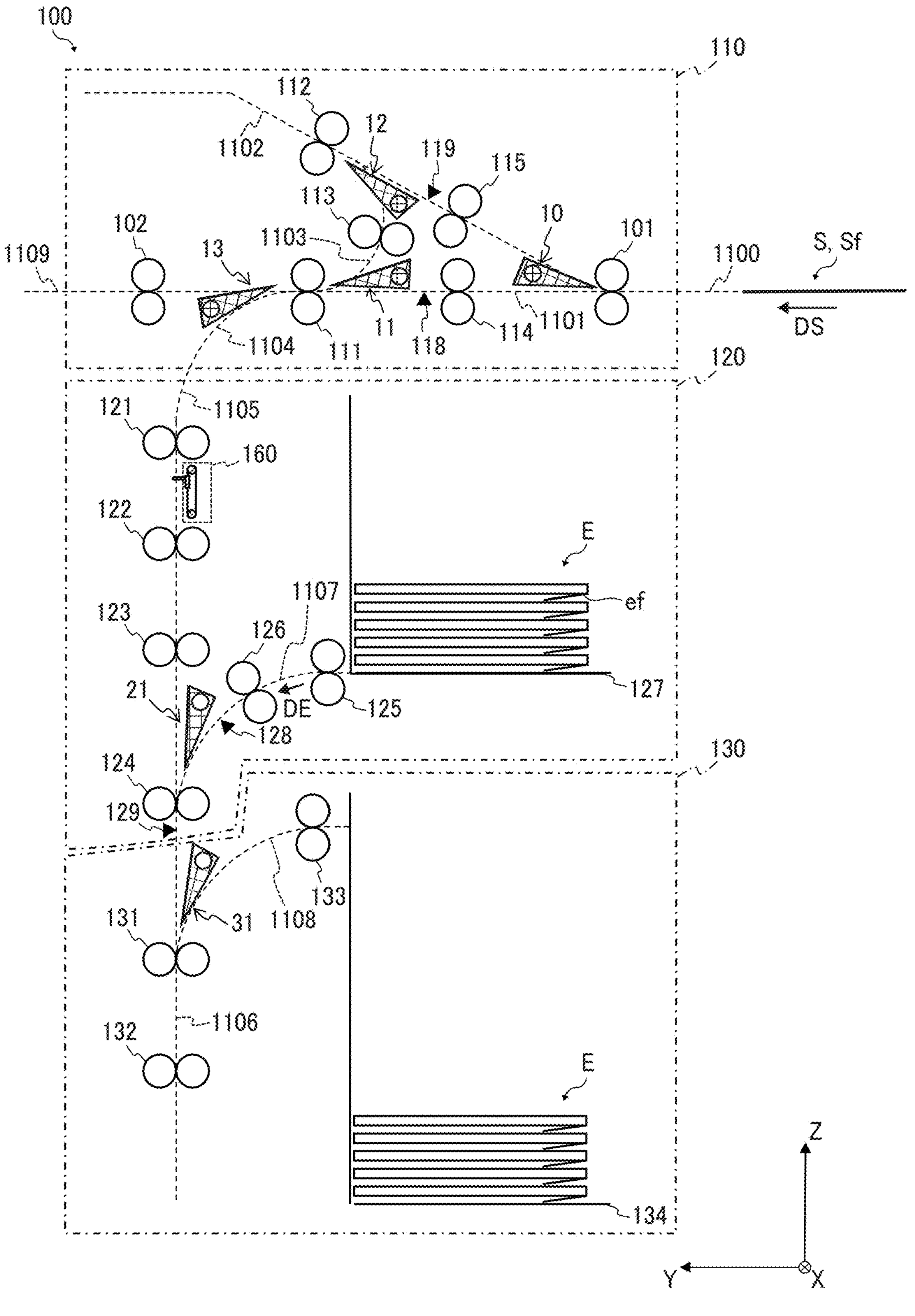
FIG. 3 is a cross-sectional view of the envelope processing apparatus incorporated in the image forming system depicted in FIG. 1.

The sealing device 130 closes the flap ef of the envelope E enclosed with the folded sheet Sf, and then ejects the sealed envelope E onto an envelope ejection tray 134 illustrated in FIG. 3.

The envelope processing controller 150 controls motion of a plurality of conveyance roller pairs that constructs the sheet reverse device 110, the enclosing device 120, and the sealing device 130 and motion of switching pawls that switch conveyance paths of the envelope E. The envelope processing controller 150 is a controller that controls conveyance of the folded sheet Sf including reversing and enclosing of the folded sheet Sf. The envelope processing controller 150 serving as the controller receives enclosing target data as data relating to the folded sheet Sf from the printer controller 260 and the folding controller 320. The envelope processing controller 150 controls conveyance of the folded sheet Sf based on an instruction indicated by each data included in the received, enclosing target data.

The enclosing target data is data relating to the sheet S and the folded sheet Sf serving as the enclosure. Specifically, the enclosing target data includes data used to control the leading end of the sheet S or the folded sheet Sf when the sheet S or the folded sheet Sf enters the envelope E to be a desired end of the sheet S or the folded sheet Sf in the sheet conveyance direction DS. For example, the enclosing target data further includes folding type data that specifies a type of folding applied to produce the folded sheet Sf. The enclosing target data further includes reverse data that specifies whether or not to perform reversing and conveyance described below of the folded sheet Sf as an operation instruction from the image forming apparatus 200 as one of the upstream apparatuses disposed upstream from the envelope processing apparatus 100 in the sheet conveyance direction DS. For example, the enclosing target data further includes print face data that specifies an image forming face of the folded sheet Sf, that bears the image. For example, the enclosing target data further includes folder type data that specifies a type of the sheet folder 310 (e.g., type A or type B) that performs folding.

The post-processing apparatus 400 includes a post-processing device 410 and a post-processing controller 420. The post-processing controller 420 controls the post-processing device 410 to perform predetermined post-processing on the sheet S conveyed from the upstream apparatus disposed upstream from the post-processing apparatus 400 in the sheet conveyance direction DS. The post-processing controller 420 controls the post-processing performed by the post-processing device 410 according to an operating mode sent from the printer controller 260, the folding controller 320, and the envelope processing controller 150 via a communication line 403.

The printer controller 260, the folding controller 320, the envelope processing controller 150, and the post-processing controller 420 are coupled with each other to communicate data needed for control via each of communication lines (e.g., the communication lines 207, 105, and 403). Thus, with linkage between controllers (e.g., the printer controller 260, the folding controller 320, the envelope processing controller 150, and the post-processing controller 420), the controllers share data relating to a processing mode in which the user requests processing on the sheet S and the folded sheet Sf and a size of the sheet S and the folded sheet Sf. Accordingly, the entirety of the print system 1 shares control data based on which each of the mechanisms described above performs predetermined processing through a predetermined process at a predetermined time.

As illustrated in FIG. 2B, the envelope processing controller 150 that performs a central control according to this embodiment includes a central processing unit (CPU) 151 serving as an arithmetic processing unit, a read only memory (ROM) 152 serving as a memory, and a random access memory (RAM) 153. The envelope processing controller 150 further includes an interface that outputs a control signal to each conveyance roller and receives a signal from each conveyance roller and another interface that receives an output signal from each sensor. The envelope processing controller 150 controls operations of the envelope processing apparatus 100 with a control program that executes control processing by using hardware resources described above.

The printer controller 260, the folding controller 320, and the post-processing controller 420, like the envelope processing controller 150, also control operations of hardware mechanisms with a control program that achieves functions by using the hardware resources constructed by the CPU 151, the ROM 152, the RAM 153, and the like.

FIGS. 1 and 2A illustrate a construction in which the envelope processing apparatus 100 is coupled with the post-processing apparatus 400 disposed downstream from the envelope processing apparatus 100 in the sheet conveyance direction DS as an example of the construction of the print system 1. The post-processing apparatus 400 is typically a finisher that staples the sheets S, a stacker, a bookbinding machine, or the like. As another example of the construction of the print system 1, the envelope processing apparatus 100 may be disposed most downstream in the sheet conveyance direction DS.

A description is provided of a control of the print system 1 according to an embodiment of the present disclosure antecedently.

The control according to this embodiment is performed based on an envelope length of the envelope E and a flap length of the flap ef that are calculated by the enclosing device 120 described below.

Before the envelope E reaches a standby position, the envelope processing controller 150, with the control program, calculates a length (e.g., the envelope length) of the envelope E and a length (e.g., the flap length) of the flap ef of the envelope E. The envelope processing controller 150 notifies the envelope length and the flap length as a calculation result to the folding controller 320, the post-processing controller 420, and the printer controller 260 through the folding controller 320.

According to this embodiment, the envelope length defines a distance between both ends of the envelope E, that is, a distance from a leading end to a trailing end of the envelope E in an envelope conveyance direction DE when the envelope E is supplied to an envelope conveyance path 1105 described below with reference to FIG. 3. Hence, according to this embodiment, the envelope length includes an envelope length (e.g., a first envelope length) of the envelope E conveyed in a close state in which the flap ef closes and an envelope length (e.g., a second envelope length) of the envelope E conveyed in an open state in which the flap ef opens. The first envelope length is equivalent to a top-to-bottom dimension of the envelope E, that is, a length from a bottom of the envelope E to a top of the envelope E in the close state in which the flap ef is folded and closed. The second envelope length is equivalent to a length from the bottom of the envelope E to an end of the flap ef in the envelope conveyance direction DE in the open state in which the flap ef opens. In a description below, the envelope length indicates the first envelope length unless otherwise specified. A value obtained by subtracting the first envelope length from the second envelope length is equivalent to a length of the flap ef in the envelope conveyance direction DE, that is referred to as the flap length.

As illustrated in FIG. 2B, the envelope processing controller 150 includes a first envelope length calculator 1501 that calculates the first envelope length and a second envelope length calculator 1502 that calculates the second envelope length. As the envelope processing controller 150 executes the control program, the first envelope length calculator 1501 and the second envelope length calculator 1502 calculate the first envelope length and the second envelope length, respectively. The envelope processing controller 150 further includes a flap length calculator 1503 that calculates the flap length of the flap of in the envelope conveyance direction DE.

A conveyance controller 1511 controls rotation of a conveyance motor 140 serving as a driver that drives and rotates the plurality of conveyance roller pairs that conveys the envelope E. The conveyance motor 140, serving as the driver that rotates each of the conveyance roller pairs described above, is disposed properly in the envelope processing apparatus 100.

The conveyance controller 1511 controls a rotation speed (e.g., a conveyance speed of the envelope E) and a rotation amount (e.g., a number of rotations) of the conveyance motor 140 and sends a notification concerning the rotation speed and the rotation amount of the conveyance motor 140 to the flap length calculator 1503.

A description is provided of a construction of the envelope processing apparatus 100, that conveys the folded sheet Sf.

Referring to FIG. 3, the following describes configurations of conveyance rollers, switching pawls that switch a conveyance direction of a conveyed object, and conveyance paths provided with the conveyance rollers and the switching pawls. The conveyance rollers, the switching pawls, and the conveyance paths construct the sheet reverse device 110, the enclosing device 120, and the sealing device 130 of the envelope processing apparatus 100.

A description is provided of a construction of the sheet reverse device 110.

As illustrated in FIG. 3, the sheet reverse device 110 includes a plurality of conveyance paths that is distinguished as an entry path 1100, a first conveyance path 1101, a second conveyance path 1102, a switchback conveyance path 1103, an enclosing conveyance path 1104 serving as a fourth conveyance path, and a sheet ejecting path 1109.

The entry path 1100 is provided with an entry roller pair 101. The entry path 1100 is a sheet conveyance path that receives the folded sheet Sf ejected from the upstream apparatus disposed upstream from the envelope processing apparatus 100 in the sheet conveyance direction DS, for example, the folding apparatus 300. The envelope processing controller 150 receives the enclosing target data as data relating to the folded sheet Sf from the controllers disposed upstream from the envelope processing controller 150 in the sheet conveyance direction DS, that is, the printer controller 260 and the folding controller 320. Thus, the envelope processing controller 150 controls the entry roller pair 101 to resume and interrupt rotation.

The first conveyance path 1101 is one of a plurality of conveyance paths disposed downstream from the entry roller pair 101 in the sheet conveyance direction DS and branches from the entry path 1100. The first conveyance path 1101 is provided with a first conveyance roller pair 111 serving as a first conveyor and a first intermediate conveyance roller pair 114. The first conveyance path 1101 is further provided with a first sheet detecting sensor 118 serving as a first medium sensor that detects an end (e.g., the trailing end) of the folded sheet Sf conveyed in the sheet conveyance direction DS. The first sheet detecting sensor 118 is interposed between the first intermediate conveyance roller pair 114 and the first conveyance roller pair 111.

The second conveyance path 1102 is one of the conveyance paths disposed downstream from the entry roller pair 101 in the sheet conveyance direction DS and branches from the entry path 1100 in a direction different from a direction in which the first conveyance path 1101 extends. The second conveyance path 1102 is provided with a second conveyance roller pair 112 serving as a second conveyor and a second intermediate conveyance roller pair 115. The second conveyance path 1102 is further provided with a second sheet detecting sensor 119 serving as a second medium sensor that detects the end (e.g., the trailing end) of the folded sheet Sf conveyed in the sheet conveyance direction DS. The second sheet detecting sensor 119 is interposed between the second intermediate conveyance roller pair 115 and the second conveyance roller pair 112.

The sheet reverse device 110 further includes the switchback conveyance path 1103. The switchback conveyance path 1103 bridges between the first conveyance path 1101 at a junction position thereon and the second conveyance path 1102 at a branch position thereon. The switchback conveyance path 1103 adjoins the first conveyance path 1101 at the junction position disposed upstream from the first conveyance roller pair 111 in the sheet conveyance direction DS. The switchback conveyance path 1103 branches from the second conveyance path 1102 at the branch position disposed downstream from the second intermediate conveyance roller pair 115 in the sheet conveyance direction DS. The switchback conveyance path 1103 switches back the folded sheet Sf conveyed through the second conveyance path 1102 downstream in the sheet conveyance direction DS and guides the folded sheet Sf to the first conveyance path 1101. The switchback conveyance path 1103 serving as a third conveyance path is provided with a switchback conveyance roller pair 113 serving as a third conveyor.

The sheet reverse device 110 further includes the sheet ejecting path 1109 that adjoins the first conveyance path 1101 and is disposed downstream from the first conveyance path 1101 in the sheet conveyance direction DS. The sheet ejecting path 1109 ejects the sheet S or the folded sheet Sf that has passed through the sheet reverse device 110 into the post-processing apparatus 400 disposed downstream from the sheet reverse device 110 in the sheet conveyance direction DS. The sheet ejecting path 1109 is provided with an exit roller pair 102.

If the folded sheet Sf conveyed from the folding apparatus 300 is not treated with enclosing described below, the folded sheet Sf passes through the entry path 1100, the first conveyance path 1101, and the sheet ejecting path 1109 and is ejected into the post-processing apparatus 400 disposed downstream from the sheet reverse device 110 in the sheet conveyance direction DS.

The sheet reverse device 110 further includes the enclosing conveyance path 1104 disposed downstream from the first conveyance roller pair 111 in the sheet conveyance direction DS and branched from the first conveyance path 1101. The enclosing conveyance path 1104 serves as the fourth conveyance path that guides the folded sheet Sf to an enclosing roller pair 121 that holds the envelope E into which the folded sheet Sf is inserted. As described below, the enclosing conveyance path 1104 is contiguous to the envelope conveyance path 1105.

The sheet reverse device 110 further includes a branch pawl 10 serving as a branch member disposed at a branch position where the first conveyance path 1101 and the second conveyance path 1102 branch from the entry path 1100. The folded sheet Sf is conveyed to the first conveyance path 1101 or the second conveyance path 1102 from the branch position. The branch pawl 10 switches a conveyance path between the first conveyance path 1101 and the second conveyance path 1102 based on the enclosing target data relating to the folded sheet Sf entering the entry path 1100 so that the branch pawl 10 guides the folded sheet Sf to the first conveyance path 1101 or the second conveyance path 1102.

The sheet reverse device 110 further includes a first switching pawl 11 serving as a first switch disposed at the junction position where the switchback conveyance path 1103 adjoins the first conveyance path 1101. The first switching pawl 11 pivots between a first position where the first switching pawl 11 guides the folded sheet Sf conveyed from the entry path 1100 to the first conveyance path 1101 toward the first conveyance roller pair 111 and a second position where the first switching pawl 11 guides the folded sheet Sf conveyed from the switchback conveyance path 1103 to the first conveyance path 1101.

The sheet reverse device 110 further includes a second switching pawl 12 serving as a second switch disposed at the branch position where the switchback conveyance path 1103 branches from the second conveyance path 1102. The second switching pawl 12 pivots between a first position where the second switching pawl 12 guides the folded sheet Sf conveyed from the entry path 1100 to the second conveyance path 1102 toward the second conveyance roller pair 112 and a second position where the second switching pawl 12 guides the folded sheet Sf conveyed from the second conveyance path 1102 to the switchback conveyance path 1103 so as to switch back the folded sheet Sf.

The sheet reverse device 110 further includes a third switching pawl 13 serving as a third switch disposed at a branch position where the enclosing conveyance path 1104 branches from the first conveyance path 1101. The third switching pawl 13 pivots between a first position where the third switching pawl 13 guides the folded sheet Sf conveyed through the first conveyance path 1101 to the enclosing conveyance path 1104 and a second position where the third switching pawl 13 guides the folded sheet Sf conveyed through the first conveyance path 1101 to the sheet ejecting path 1109.

The first intermediate conveyance roller pair 114 conveys the folded sheet Sf conveyed through the first conveyance path 1101 to the first conveyance roller pair 111. The first conveyance roller pair 111 conveys the conveyed, folded sheet Sf downstream in the sheet conveyance direction DS. When the third switching pawl 13 is at the first position depicted in FIG. 3, the third switching pawl 13 guides the folded sheet Sf to the enclosing conveyance path 1104. When the folded sheet Sf is conveyed for a predetermined distance after the first sheet detecting sensor 118 detects the trailing end of the folded sheet Sf conveyed from the first intermediate conveyance roller pair 114 to the first conveyance roller pair 111, the folded sheet Sf has already moved to the enclosing conveyance path 1104. Accordingly, the conveyance roller pairs of the sheet reverse device 110, that have rotated, interrupt rotation.

The second intermediate conveyance roller pair 115 conveys the folded sheet Sf conveyed through the second conveyance path 1102 to the second conveyance roller pair 112. When the folded sheet Sf is conveyed for a predetermined distance after the second sheet detecting sensor 119 detects the trailing end of the folded sheet Sf conveyed through the second conveyance path 1102 in the sheet conveyance direction DS, the second conveyance roller pair 112 interrupts forward rotation, and then starts backward rotation. Thus, the second conveyance roller pair 112 conveys the folded sheet Sf through the switchback conveyance path 1103 that switches back the folded sheet Sf. Before the second conveyance roller pair 112 rotates backward or at a time when the second conveyance roller pair 112 rotates backward, at a time when the trailing end of the folded sheet Sf in the sheet conveyance direction DS passes the second switching pawl 12, that is determined based on a detection result provided by the second sheet detecting sensor 119, the second switching pawl 12 pivots. Thus, the second switching pawl 12 reaches the second position where the second switching pawl 12 guides the folded sheet Sf to the switchback conveyance path 1103.

As the second switching pawl 12 guides the folded sheet Sf from the second conveyance path 1102 to the switchback conveyance path 1103, the switchback conveyance roller pair 113 conveys the folded sheet Sf to the first conveyance path 1101.

A description is provided of a construction of the enclosing device 120.

As illustrated in FIG. 3, the enclosing device 120 includes the envelope conveyance path 1105 adjoining the enclosing conveyance path 1104 serving as the fourth conveyance path. The envelope conveyance path 1105 receives the sheet S or the folded sheet Sf serving as the enclosure conveyed from the sheet reverse device 110 and conveys the sheet S or the folded sheet Sf to be inserted into the envelope E. The envelope conveyance path 1105 is provided with an envelope holder that conveys the envelope E to a predetermined position and holds the envelope E such that the enclosure is inserted into the envelope E.

The envelope conveyance path 1105 adjoins a sealing path 1106 that seals the envelope E enclosed with the enclosure.

The envelope conveyance path 1105 is provided with a first vertical conveyance roller pair 122 and a second vertical conveyance roller pair 123 that convey the envelope E to a reception position where the envelope E receives the folded sheet Sf. The enclosing roller pair 121 disposed in the envelope conveyance path 1105 holds the envelope E conveyed to the reception position where the envelope E receives the folded sheet Sf.

An enclosure presser 160 is interposed between the enclosing roller pair 121 and the first vertical conveyance roller pair 122 and disposed beside the envelope conveyance path 1105. A construction of the enclosure presser 160 is described below in detail.

Figure 4:
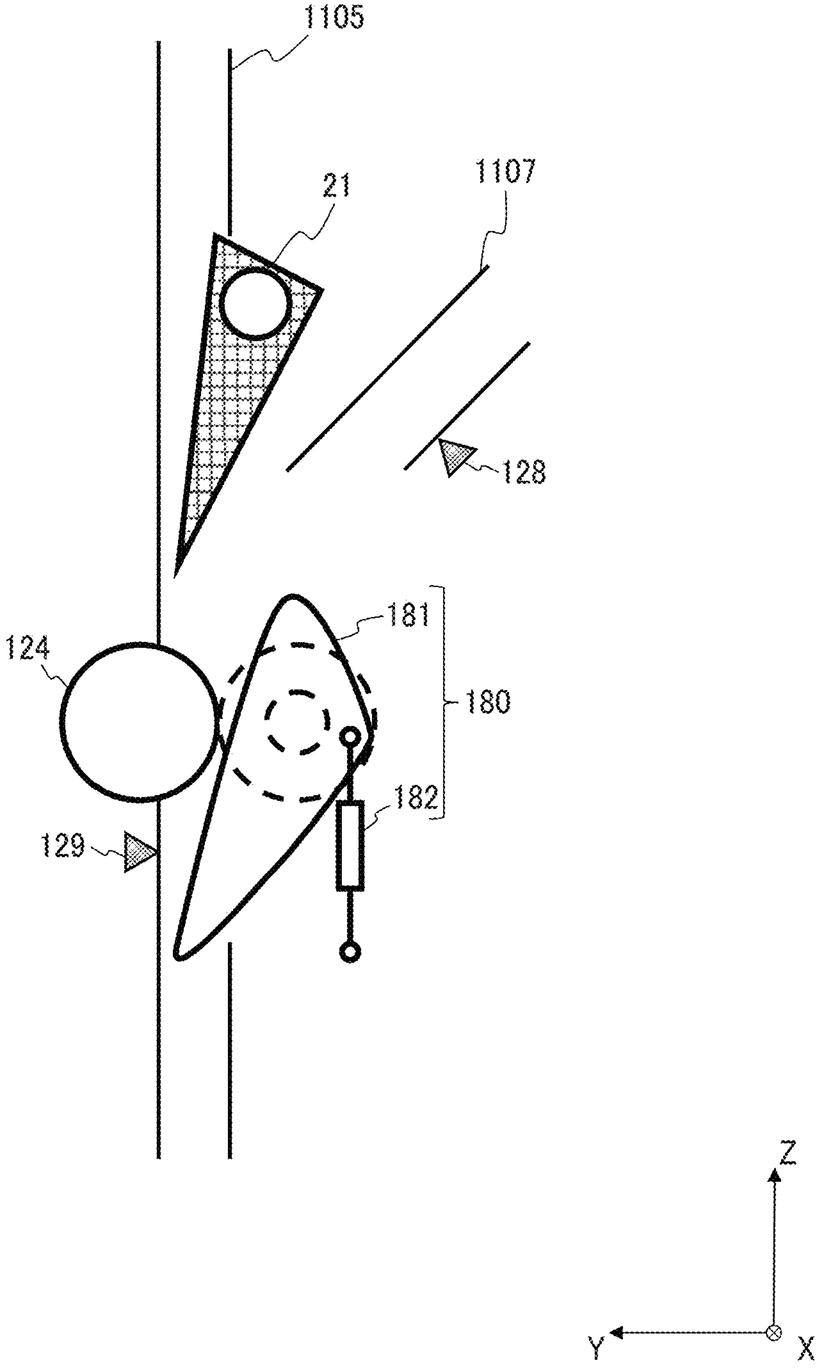
FIG. 4 is a schematic cross-sectional view of a flap opener incorporated in the envelope processing apparatus depicted in FIG. 3.

A flap opening roller pair 124 is disposed at a junction position where the envelope conveyance path 1105 adjoins the sealing path 1106. As illustrated in FIG. 4, the flap opening roller pair 124 is attached with a flap opener 180 that opens the flap ef before the flap opening roller pair 124 conveys the envelope E ejected from an envelope tray 127 illustrated in FIG. 3 to the predetermined position described above. A flap opening detecting sensor 129 is disposed downstream from the flap opening roller pair 124 in the envelope conveyance direction DE. The flap opening detecting sensor 129 detects that the flap ef opens.

An envelope switchback switching pawl 21 is disposed at a junction position where an envelope entry path 1107 adjoins the envelope conveyance path 1105.

The envelope entry path 1107 adjoining the envelope conveyance path 1105 is provided with a separating roller pair 125, an envelope conveyance roller pair 126, and a separation sensor 128 serving as a first envelope detector. The envelope tray 127 adjoins an end of the envelope entry path 1107.

A plurality of envelopes E is placed on the envelope tray 127. Each of the envelopes E placed on the envelope tray 127 includes the bottom, that is, an opposite end being opposite to the flap ef. The bottom of the envelope E faces the separating roller pair 125. Hence, the bottom of the envelope E serves as the leading end of the envelope E in the envelope conveyance direction DE when the envelope E is ejected from the envelope tray 127. Another end of the envelope E, that is provided with the flap ef, serves as the trailing end of the envelope E in the envelope conveyance direction DE.

According to this embodiment, when one envelope E placed on the envelope tray 127 is separated from other envelopes E and conveyed, one end, that is, the bottom, of the envelope E serves as the leading end of the envelope E in the envelope conveyance direction DE. Another end of the envelope E, that is provided with the flap ef, serves as the trailing end of the envelope E in the envelope conveyance direction DE. The trailing end of the envelope E in the envelope conveyance direction DE in the close state in which the flap ef closes is equivalent to a folding position of the flap ef of the envelope E. The trailing end of the envelope E in the envelope conveyance direction DE in the open state in which the flap ef opens is equivalent to the end of the flap ef of the envelope E.

As the separating roller pair 125 picks up one envelope E from the plurality of envelopes E placed on the envelope tray 127, the envelope conveyance roller pair 126 and the flap opening roller pair 124 convey the envelope E to a past position that is past the envelope switchback switching pawl 21.

The envelope switchback switching pawl 21 pivots between a first position and a second position. At the first position, the envelope switchback switching pawl 21 temporarily guides the envelope E picked up from the envelope tray 127 to the sealing path 1106. At the second position, the envelope switchback switching pawl 21 guides the envelope E to the envelope conveyance path 1105 so that the envelope E is conveyed toward the sheet reverse device 110 through the envelope conveyance path 1105. Thus, the envelope switchback switching pawl 21 switches a conveyance direction of the envelope E.

The first vertical conveyance roller pair 122 and the second vertical conveyance roller pair 123 convey the envelope E to the predetermined position in the envelope conveyance path 1105. When the flap ef of the envelope E is sandwiched by a flap holding roller pair 169 and conveyed to a predetermined position, the first vertical conveyance roller pair 122, the second vertical conveyance roller pair 123, and the flap holding roller pair 169 interrupt conveyance of the envelope E. At the predetermined position, as described below, the mouth Ip of the envelope E (e.g., a lower edge of the flap ef) is disposed below the enclosing roller pair 121 and above the first vertical conveyance roller pair 122 in FIG. 3.

The enclosing roller pair 121 is one type of a pair of conveyance rollers, that rotates in the enclosing direction in which the folded sheet Sf conveyed from the sheet reverse device 110 is inserted into the envelope E.

A description is provided of a construction of the sealing device 130.

As illustrated in FIG. 3, the sealing device 130 includes the sealing path 1106 provided with a third vertical conveyance roller pair 131 and a fourth vertical conveyance roller pair 132. The sealing device 130 further includes an envelope ejecting path 1108 that branches from the sealing path 1106. An envelope ejecting switching pawl 31 is disposed at a branch position where the envelope ejecting path 1108 branches from the sealing path 1106. The envelope ejecting path 1108 is provided with an envelope ejecting roller pair 133. The envelope ejecting tray 134 adjoins an end of the envelope ejecting path 1108.

The third vertical conveyance roller pair 131 and the fourth vertical conveyance roller pair 132 convey the envelope E to a predetermined position in the sealing path 1106 and hold the envelope E.

The envelope ejecting switching pawl 31 pivots between a first position and a second position. At the first position, the envelope ejecting switching pawl 31 guides the envelope E from the flap opening roller pair 124 to the third vertical conveyance roller pair 131 through the sealing path 1106. At the second position, the envelope ejecting switching pawl 31 guides the envelope E from the sealing path 1106 to the envelope ejecting path 1108. Thus, the envelope ejecting switching pawl 31 switches the conveyance direction of the envelope E.

The envelope ejecting roller pair 133 ejects the envelope E onto the envelope ejection tray 134.

The envelope ejection tray 134 is placed with the envelope E ejected by the envelope ejecting roller pair 133.

As described above, in the envelope processing apparatus 100, the conveyance paths (e.g., the envelope conveyance path 1105 and the sealing path 1106) that convey the folded sheet Sf from the sheet reverse device 110 to the enclosing device 120 and the sealing device 130 are arranged contiguously and vertically in the Z-direction. The conveyance paths that convey the folded sheet Sf and the envelope E construct a vertical conveyance path that couples the envelope conveyance path 1105 of the enclosing device 120 with the sealing path 1106 of the sealing device 130 vertically in the Z-direction.

Referring to FIG. 4, a detailed description is provided of a construction of the flap opener 180 attached to the flap opening roller pair 124.

The flap opener 180 includes a flap scooping pawl 181 and a spring 182. The flap scooping pawl 181 is pivotally attached to a rotation shaft of one of a pair of conveyance rollers constructing the flap opening roller pair 124. The spring 182 biases the flap scooping pawl 181.

As the envelope E conveyed through the envelope entry path 1107 presses against the flap scooping pawl 181, the flap scooping pawl 181 pivots to cause the envelope E to pass through the envelope conveyance path 1105. The flap scooping pawl 181 is at a default position where the spring 182 biases the flap scooping pawl 181 to close the envelope conveyance path 1105. The flap scooping pawl 181 contacts a conveyance guide that constructs the envelope conveyance path 1105 and restricts pivoting of the flap scooping pawl 181 by the spring 182.

As illustrated in FIG. 4, the envelope entry path 1107 is provided with the separation sensor 128. The flap opening detecting sensor 129 serving as a second envelope detector is disposed in proximity to the flap opening roller pair 124.

Figure 5:
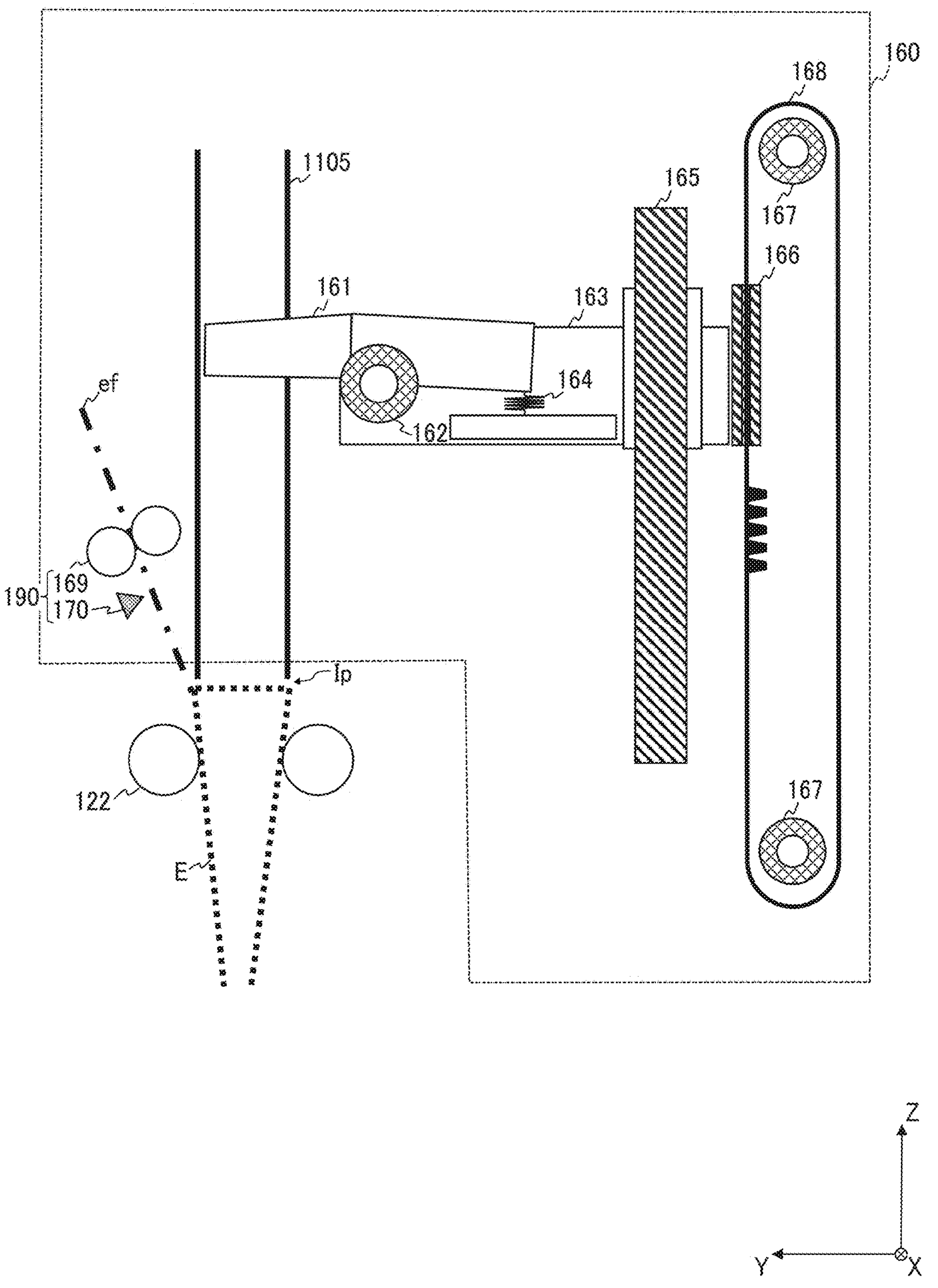
FIG. 5 is a schematic cross-sectional view of an enclosure presser incorporated in the envelope processing apparatus depicted in FIG. 3.

Referring to FIG. 5, a description is provided of a construction of the enclosure presser 160 of the enclosing device 120.

FIG. 5 schematically illustrates a main construction of the enclosure presser 160. The enclosure presser 160 serving as a medium presser includes, as the main construction thereof, a pressing pawl 161, a pawl rotation shaft 162, a slider 163, a spring 164, a slider bar shaft 165, a belt mount 166, rotation gears 167, a toothed belt 168, the flap holding roller pair 169, and a flap detecting sensor 170.

The flap ef of the envelope E conveyed to the enclosing position is guided to and held by the flap holding roller pair 169. A guide plate or the like guides and orients the flap ef to the flap holding roller pair 169.

The flap detecting sensor 170 detects whether or not the flap holding roller pair 169 holds the flap ef. Based on a detection result provided by the flap detecting sensor 170 and the flap length of the flap ef, that is calculated in advance, even if the envelope E varies in size and type, the envelope processing controller 150 controls a conveyance amount of the envelope E so that the mouth Ip of the envelope E reaches the predetermined position.

The flap holding roller pair 169 and the flap detecting sensor 170 construct a flap holder 190 that holds and detects the flap ef.

The mouth Ip of the envelope E is positioned properly regardless of the flap length of the flap ef. Hence, when the pressing pawl 161 presses the conveyed enclosure into the envelope E, the enclosure does not protrude from the envelope E and is not pressed into the envelope E excessively, for example. Thus, the enclosure presser 160 prevents faulty enclosing and performs proper enclosing.

When the enclosure (e.g., the folded sheet Sf) is conveyed from the sheet reverse device 110 to the envelope conveyance path 1105, the pressing pawl 161 incorporating a motion restrictor is situated at a default position where the pressing pawl 161 contacts the enclosure. As the conveyed enclosure comes into contact with an upper face of the pressing pawl 161, the enclosure presses down the pressing pawl 161 in a gravity direction. Thus, the conveyed enclosure (e.g., the folded sheet Sf) pivots the pressing pawl 161 counterclockwise in FIG. 6A. As a result, the pressing pawl 161 is situated at the enclosing position where the pressing pawl 161 allows the folded sheet Sf serving as the enclosure to move to the envelope E.

When the pressing pawl 161 is not applied with an external force as described above, the spring 164 biases the pressing pawl 161 so that the pressing pawl 161 reverts to the default position depicted in FIG. 5 where the pressing pawl 161 crosses the envelope conveyance path 1105 in a width direction thereof.

The pressing pawl 161 pivots about the pawl rotation shaft 162. The pawl rotation shaft 162 is mounted on the slider 163.

One end of the spring 164 is anchored to the slider 163. Another end of the spring 164 is anchored to an end of the pressing pawl 161. Accordingly, when the pressing pawl 161 pivots about the pawl rotation shaft 162 counterclockwise, the pressing pawl 161 pivots in a direction against a biasing force from the spring 164. That is, as the enclosure presses down a front end of the pressing pawl 161 with a force greater than the biasing force from the spring 164, the enclosure is inserted into the envelope E.

Figure 6A:
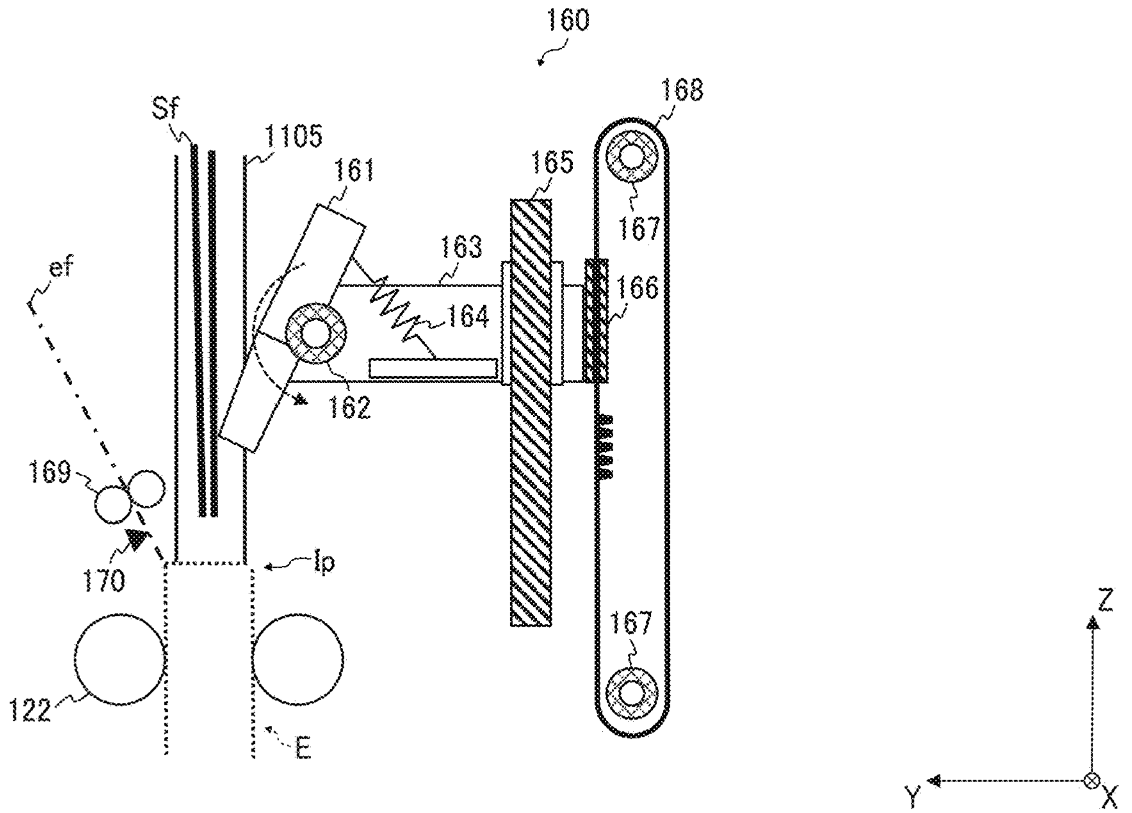
FIG. 6A is a schematic cross-sectional view of the enclosure presser depicted in FIG. 5, illustrating a motion thereof.
Figure 6B:
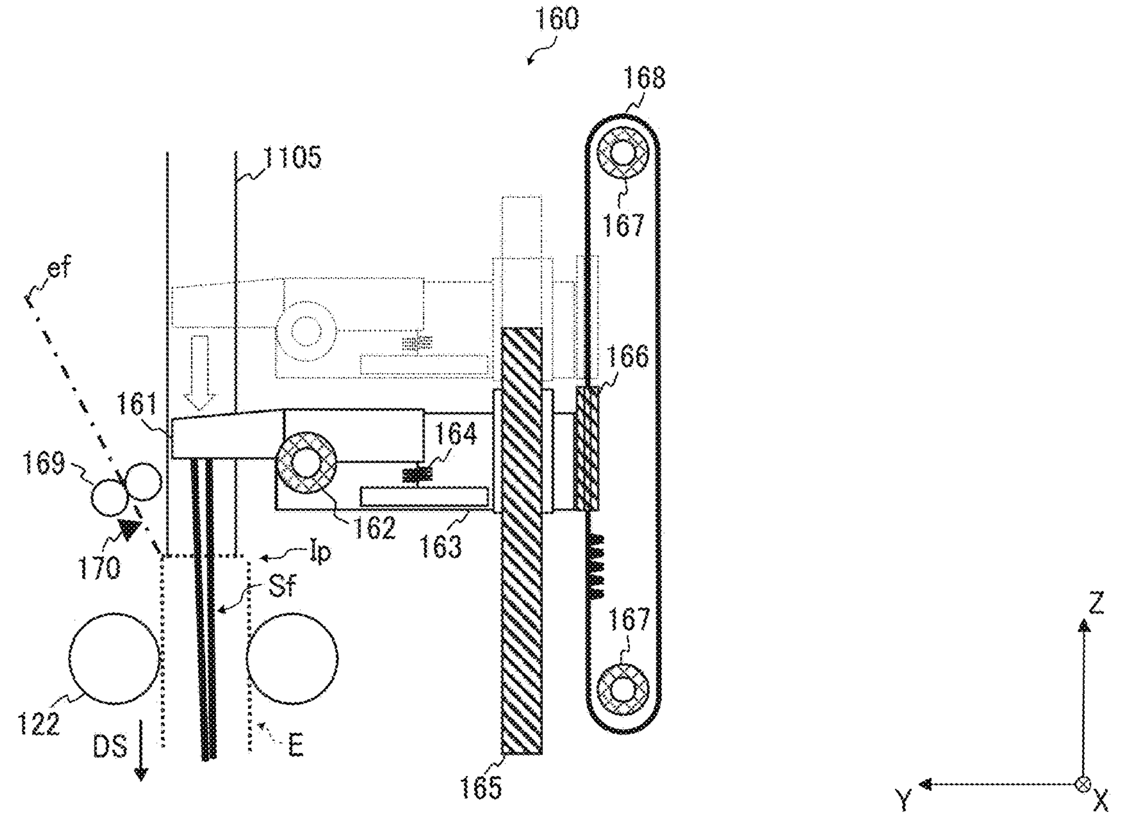
FIG. 6B is a schematic cross-sectional view of the enclosure presser depicted in FIG. 6A, illustrating another motion thereof.

Conversely, as illustrated in FIG. 6B, when the pressing pawl 161 is applied with a force that pivots the pressing pawl 161 clockwise, a rear end of the pressing pawl 161 presses the spring 164 and comes into contact with the slider 163 anchored with the spring 164. Accordingly, the pressing pawl 161 does not pivot counterclockwise.

The slider 163 is slidably supported by the slider bar shaft 165. The slider 163 includes a first end disposed opposite the pressing pawl 161 and a second end opposite to the first end. The belt mount 166 is disposed on the second end of the slider 163. The belt mount 166 is mounted on the toothed belt 168 that meshes with the rotation gears 167. The slider bar shaft 165 serves as a guide that slides the slider 163 along the envelope conveyance path 1105. Thus, the slider bar shaft 165 supports the slider 163 such that the slider 163 slides in a direction (e.g., the Z-direction) in which the envelope conveyance path 1105 extends.

The envelope processing controller 150 controls a rotation amount of each of the rotation gears 167 based on the envelope length of the envelope E and the flap length of the flap ef. As the rotation gears 167 rotate, the toothed belt 168 looped over the rotation gears 167 rotates. As the toothed belt 168 rotates, the slider 163 mounted on the belt mount 166 moves in a rotation direction of the toothed belt 168. As described above, the slider 163 moves in the Z-direction. As the rotation gears 167 rotate, the slider bar shaft 165 guides and slides the slider 163 in the Z-direction.

Referring to FIGS. 6A and 6B, a description is provided of operations of the enclosure presser 160.

As illustrated in FIG. 6A, when the folded sheet Sf serving as the enclosure is conveyed from the enclosing conveyance path 1104 depicted in FIG. 3 to the envelope conveyance path 1105, the pressing pawl 161 is held at the default position where the pressing pawl 161 crosses the envelope conveyance path 1105 as illustrated in FIG. 5. As the folded sheet Sf comes into contact with the upper face of the pressing pawl 161 and is conveyed, the folded sheet Sf presses against the pressing pawl 161, pivoting the pressing pawl 161 about the pawl rotation shaft 162 as illustrated in FIG. 6A. Accordingly, the pressing pawl 161 retracts from the envelope conveyance path 1105, causing the folded sheet Sf to be ready for being inserted into the envelope E.

The folded sheet Sf passes beside the pressing pawl 161 and is conveyed toward the envelope E. When the folded sheet Sf is past the pressing pawl 161, the pressing pawl 161 is free from the external force (e.g., pressure) that presses down the pressing pawl 161. Accordingly, the biasing force from the spring 164 returns the pressing pawl 161 to the default position depicted in FIG. 5.

Thereafter, as illustrated in FIG. 6B, the rotation gears 167 rotate, moving the slider 163 downward toward a position where the envelope E is held. As the slider 163 moves, a part of a lower face of the pressing pawl 161, that contacts the folded sheet Sf, presses down the trailing end of the folded sheet Sf in the sheet conveyance direction DS into the envelope E. The mouth Ip of the envelope E is held such that the mouth Ip gapes. That is, a moving direction in which the pressing pawl 161 moves as the slider 163 slides is equivalent to a pressing direction in which the pressing pawl 161 presses down the folded sheet Sf.

Referring to FIGS. 7, 8, 9A, 9B, 9C, 9D, 10, 11, 12, 13, 14, 15, 16, and 17, a description is provided of an example of a series of processes for enclosing and sealing, that is performed by the envelope processing apparatus 100.

In the drawings, reference numerals and the like are assigned to elements used in the description of the series of processes for enclosing and sealing.

Figure 7:
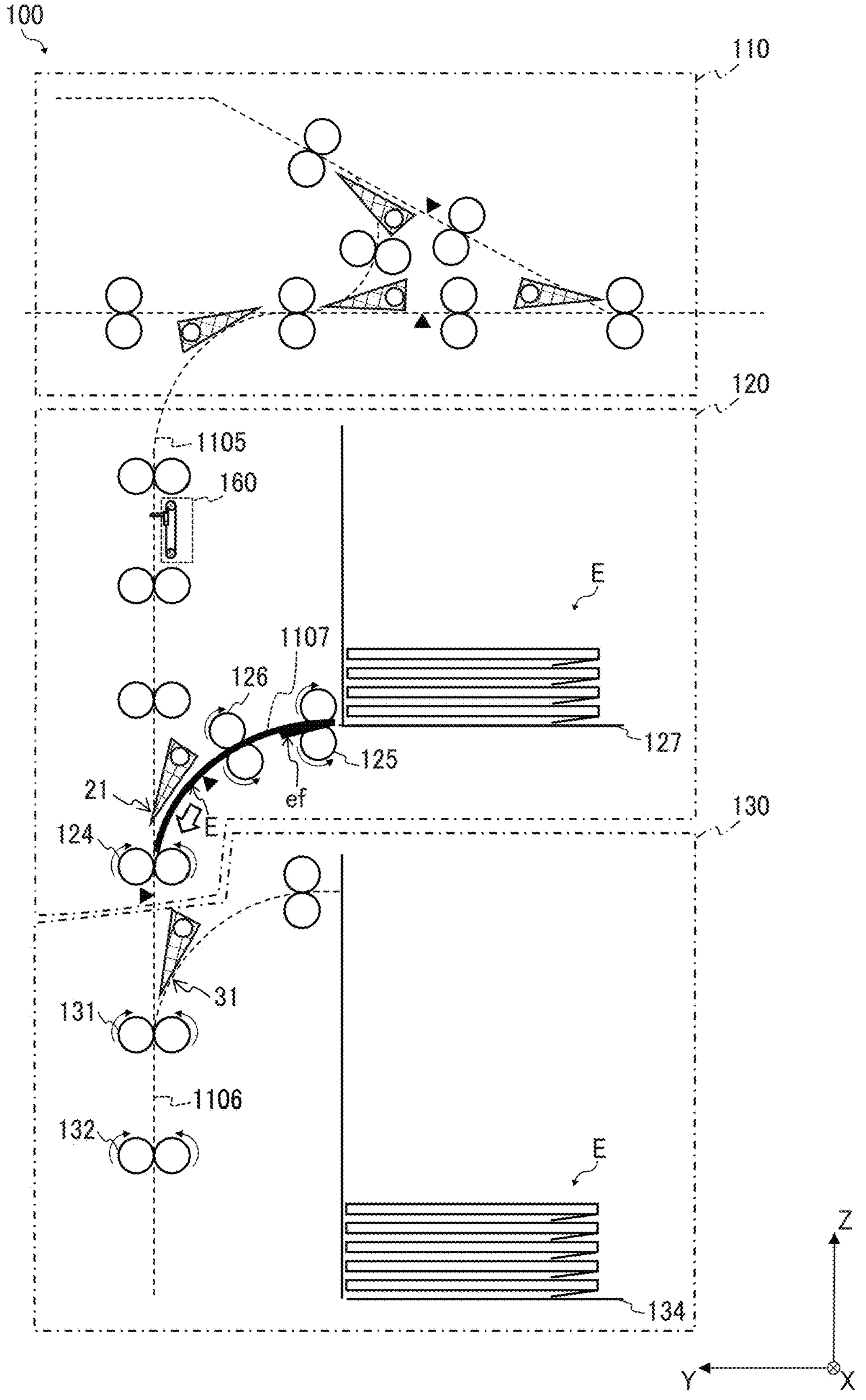
FIG. 7 is a cross-sectional view of the envelope processing apparatus depicted in FIG. 3, illustrating a process for enclosing performed by the envelope processing apparatus.

As illustrated in FIG. 7, the separating roller pair 125 separates the plurality of envelopes E placed on the envelope tray 127 one by one. Thereafter, the envelope conveyance roller pair 126 conveys the envelope E to the flap opening roller pair 124. The envelope switchback switching pawl 21 and the envelope ejecting switching pawl 31 are oriented in directions illustrated in FIG. 7, respectively. The flap opening roller pair 124, the third vertical conveyance roller pair 131, and the fourth vertical conveyance roller pair 132 rotate in a direction to convey the envelope E downward, conveying the envelope E to the predetermined position in the sealing path 1106.

Figure 8:
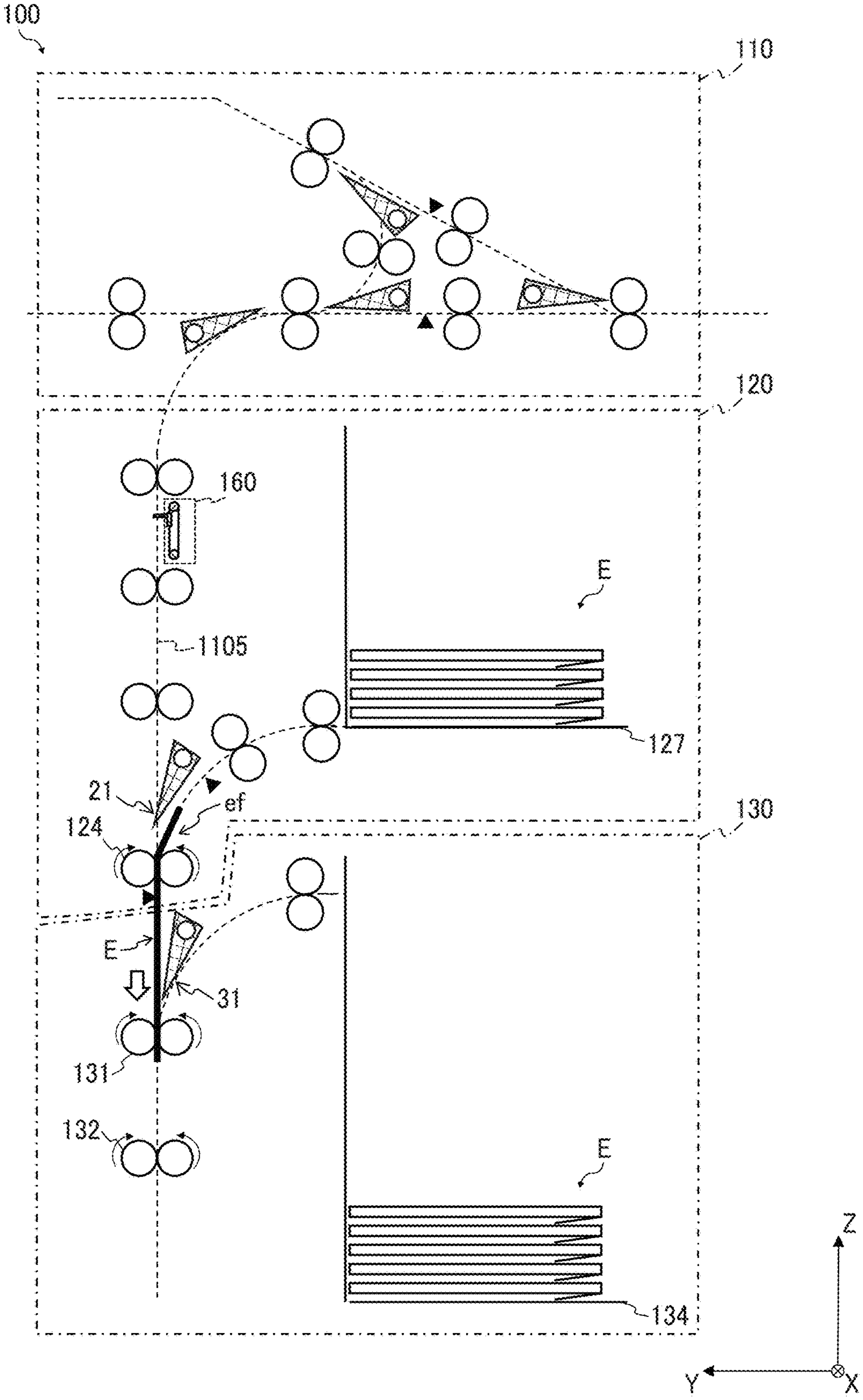
FIG. 8 is a cross-sectional view of the envelope processing apparatus depicted in FIG. 3, illustrating another process for enclosing performed by the envelope processing apparatus.

Subsequently, as illustrated in FIG. 8, before the envelope E passes the flap opening roller pair 124, the flap opener 180 depicted in FIG. 4 opens the flap ef of the envelope E. The flap opening roller pair 124, the third vertical conveyance roller pair 131, and the fourth vertical conveyance roller pair 132 continue rotating, as illustrated in FIG. 8.

Referring to FIGS. 9A, 9B, 9C, and 9D, a description is provided of operations of the flap opener 180 and calculation of the envelope length of the envelope E.

Figure 9A:
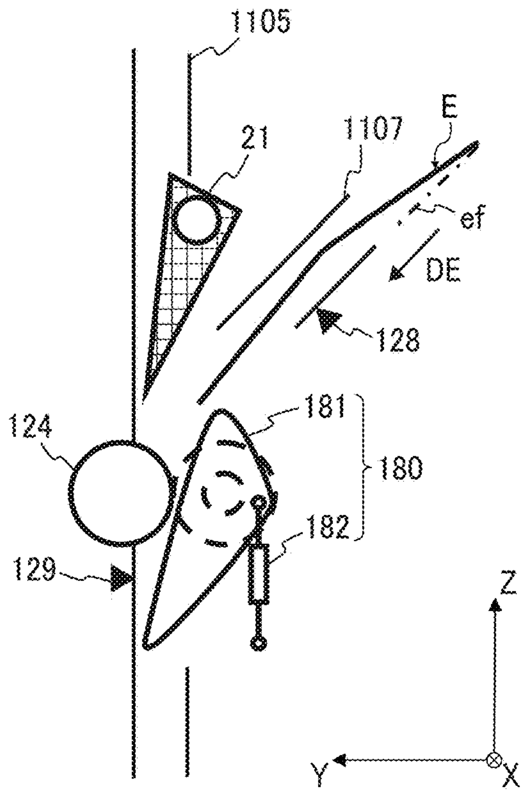
FIG. 9A is a cross-sectional view of the flap opener depicted in FIG. 4, illustrating a motion thereof during enclosing performed by the envelope processing apparatus.

As illustrated in FIG. 9A, the separation sensor 128 detects the envelope E that is separated one by one by the separating roller pair 125 and conveyed. For example, the separation sensor 128 detects the leading end of the envelope E in the envelope conveyance direction DE before the envelope E reaches a nip formed between two rollers constructing the flap opening roller pair 124.

Figure 9B:
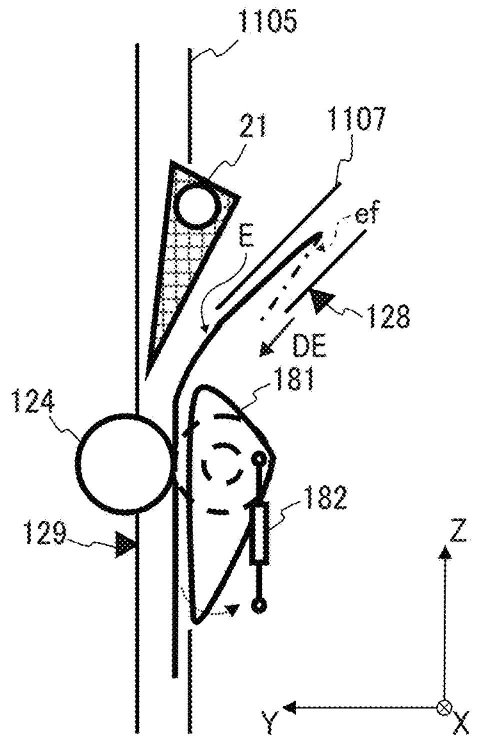
FIG. 9B is a cross-sectional view of the flap opener depicted in FIG. 9A, illustrating another motion thereof.

Subsequently, as illustrated in FIG. 9B, as the leading end of the envelope E in the envelope conveyance direction DE presses down and pivots the flap scooping pawl 181, the flap opening roller pair 124 farther conveys the envelope E downstream in the envelope conveyance direction DE. The separation sensor 128 also detects the flap ef of the envelope E while the flap ef passes over the separation sensor 128. Hence, the separation sensor 128 also detects the trailing end of the envelope E in the envelope conveyance direction DE. Accordingly, based on a time period (e.g., a time difference) that elapses after the separation sensor 128 detects the leading end of the envelope E until the separation sensor 128 detects the trailing end of the envelope E in the envelope conveyance direction DE, and a conveyance speed at which the envelope E is conveyed or a number of rotations of the envelope conveyance roller pair 126 depicted in FIG. 7, the envelope processing controller 150 calculates the first envelope length as the envelope length of the envelope E in the close state in which the flap ef closes.

A part of the flap scooping pawl 181 that pivots slightly presses and lifts the envelope E conveyed through the envelope entry path 1107, thus bending a conveyance route of the envelope E.

Figure 9C:
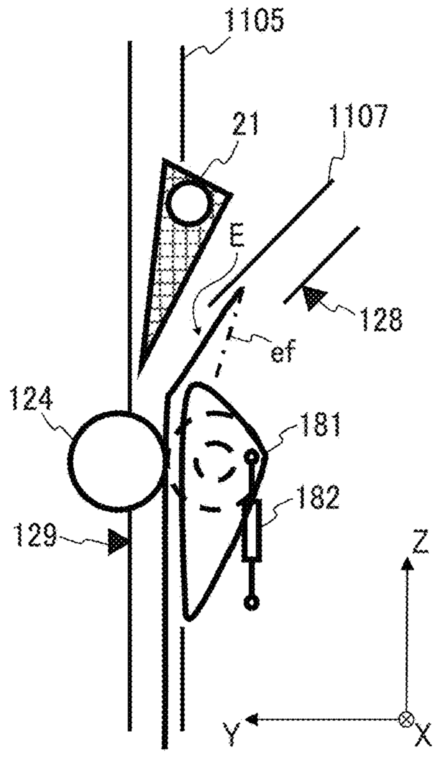
FIG. 9C is a cross-sectional view of the flap opener depicted in FIG. 9A, illustrating yet another motion thereof.

As the flap opening roller pair 124 conveys the envelope E farther, as illustrated in FIG. 9C, the flap ef engages a part of the flap scooping pawl 181.

Figure 9D:
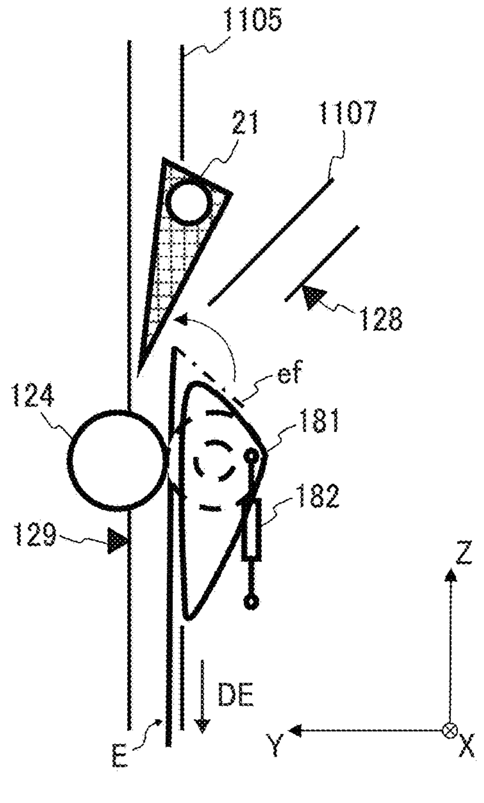
FIG. 9D is a cross-sectional view of the flap opener depicted in FIG. 9A, illustrating yet another motion thereof.

As the flap opening roller pair 124 conveys the envelope E even farther, as illustrated in FIG. 9D, a part of the flap scooping pawl 181 pivots the flap ef toward the envelope entry path 1107. Accordingly, in the open state in which the flap ef of the envelope E opens, the flap opening roller pair 124 farther conveys the envelope E in the envelope conveyance direction DE.

Figure 10:
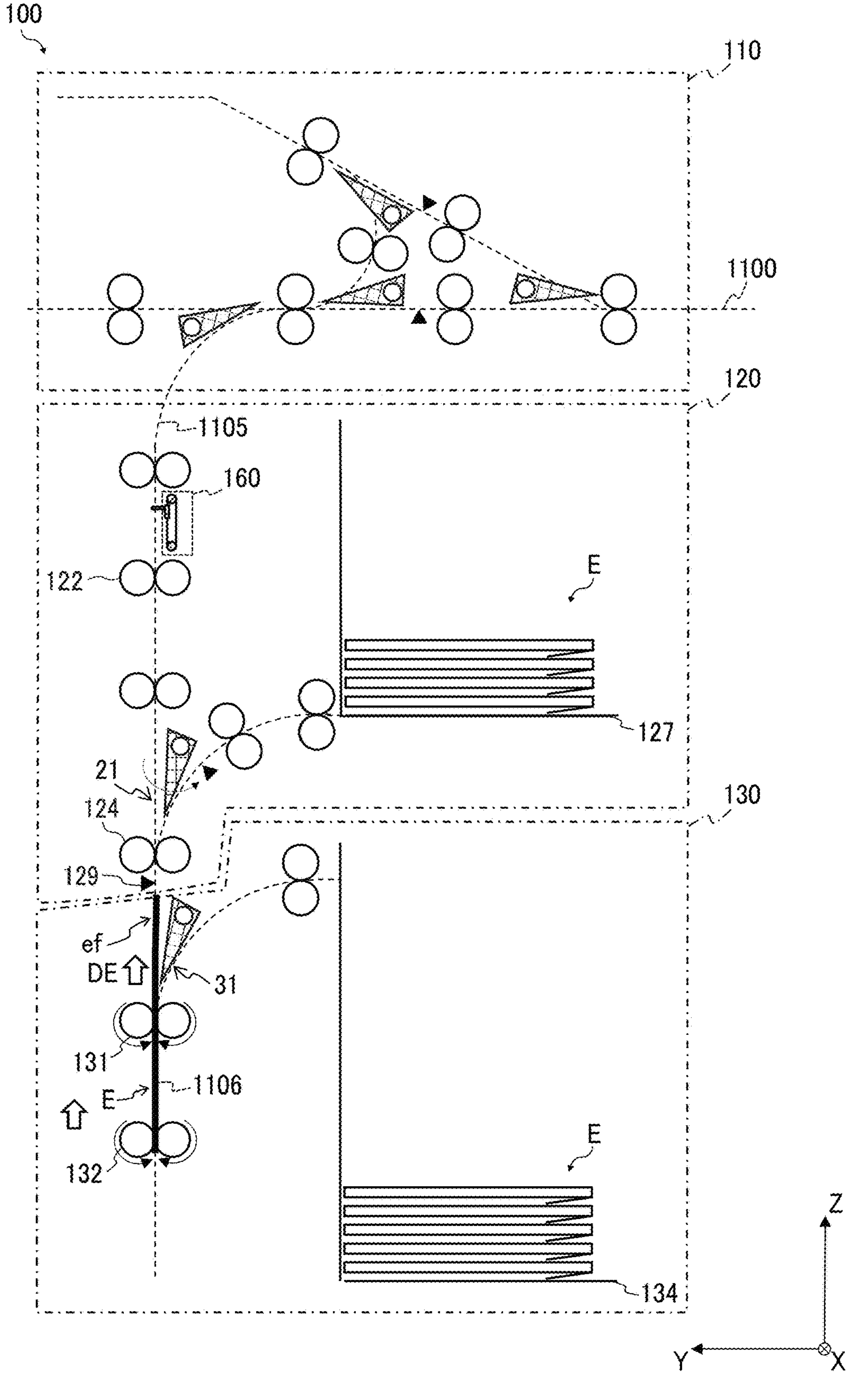
FIG. 10 is a cross-sectional view of the envelope processing apparatus depicted in FIG. 3, illustrating yet another process for enclosing performed by the envelope processing apparatus.

Subsequently, as illustrated in FIG. 10, after the flap ef of the envelope E opens and the flap ef is past the flap opening roller pair 124, the third vertical conveyance roller pair 131 and the fourth vertical conveyance roller pair 132 rotate backward, switching back and conveying the envelope E to the predetermined position in the enclosing device 120. Before switchback conveyance of the envelope E starts or simultaneously with switchback conveyance, the envelope switchback switching pawl 21 pivots in a direction illustrated with an arrow in FIG. 10. Accordingly, the envelope switchback switching pawl 21 allows the envelope E to be conveyed upward through the envelope conveyance path 1105 in FIG. 10.

The flap opening detecting sensor 129 detects one end (e.g., the trailing end), that is, the leading end in switchback conveyance, of the opened flap ef in the envelope conveyance direction DE.

Figure 11:
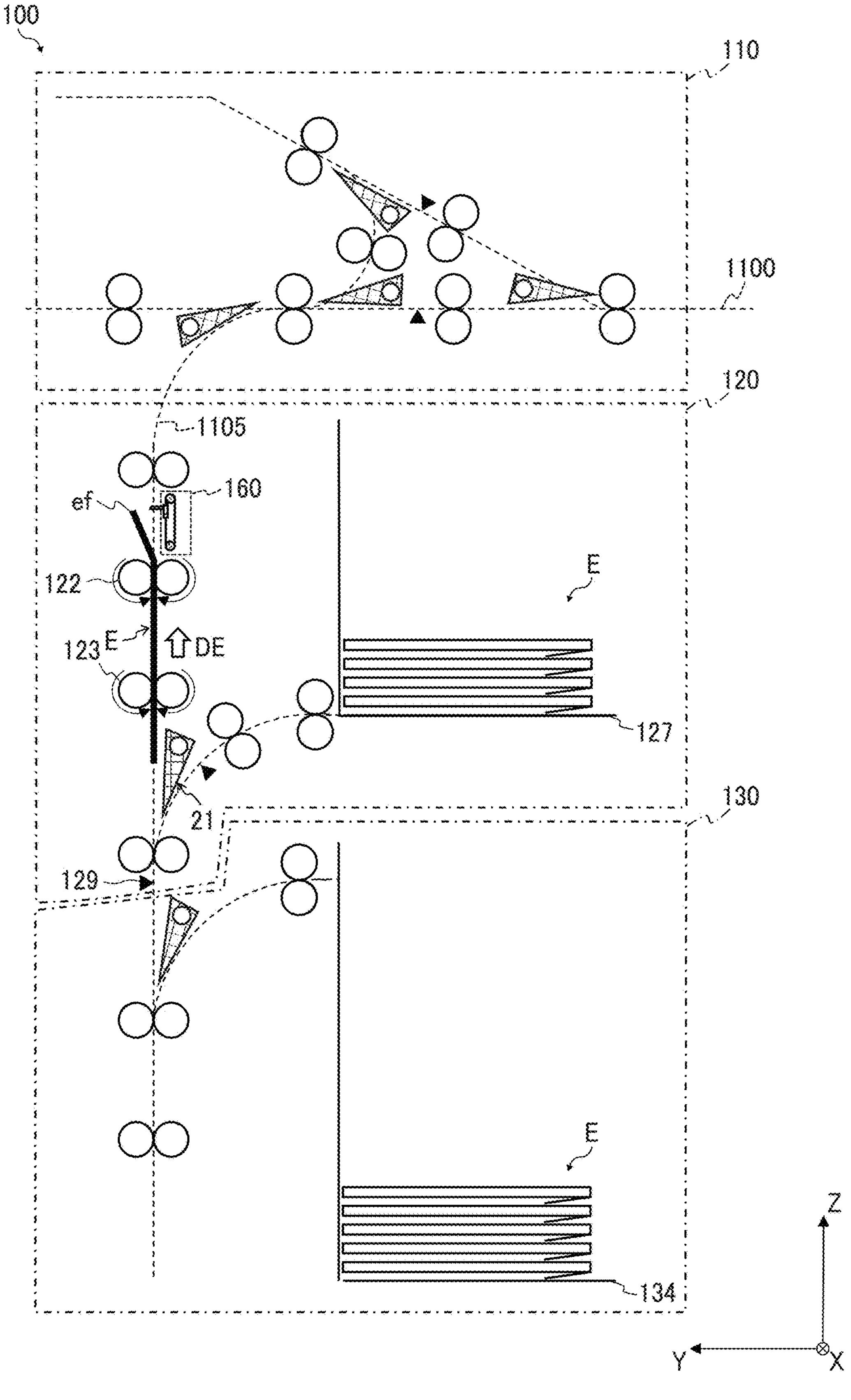
FIG. 11 is a cross-sectional view of the envelope processing apparatus depicted in FIG. 3, illustrating yet another process for enclosing performed by the envelope processing apparatus.

Subsequently, as illustrated in FIG. 11, before the flap ef passes the first vertical conveyance roller pair 122, the flap opening detecting sensor 129 detects the bottom (e.g., the leading end), that is, the trailing end in switchback conveyance, of the envelope E in the envelope conveyance direction DE. Accordingly, based on a time period that elapses after the flap opening detecting sensor 129 detects the trailing end, that is, the leading end in switchback conveyance, of the envelope E (e.g., one end of the flap ef) in the envelope conveyance direction DE until the flap opening detecting sensor 129 detects the leading end (e.g., the bottom), that is, the trailing end in switchback conveyance, of the envelope E in the envelope conveyance direction DE, and a conveyance speed at which the envelope E is conveyed or a number of rotations of the third vertical conveyance roller pair 131 and the fourth vertical conveyance roller pair 132, the envelope processing controller 150 calculates the second envelope length as the envelope length of the envelope E in the open state in which the flap ef opens.

Alternatively, as a method for calculating the second envelope length, after the envelope E is conveyed from the envelope tray 127 in the envelope conveyance direction DE (e.g., the negative Z-direction) until the envelope E is conveyed to a switchback position depicted in FIG. 10, the flap opening detecting sensor 129 may detect the leading end and the trailing end of the envelope E in the envelope conveyance direction DE (e.g., the negative Z-direction). Thus, the envelope processing controller 150 calculates the second envelope length of the envelope E in the open state in which the flap ef opens. Accordingly, even if the second envelope length of the envelope E in the open state in which the flap ef opens is greater than a distance from the flap opening detecting sensor 129 to the first vertical conveyance roller pair 122, the flap opening detecting sensor 129 detects the second envelope length of the envelope E precisely.

The envelope processing controller 150 subtracts the envelope length (e.g., the first envelope length) of the envelope E in the close state in which the flap ef closes from the envelope length (e.g., the second envelope length) of the envelope E in the open state in which the flap ef opens, thus calculating a length of the flap ef (e.g., the flap length).

As illustrated in FIG. 11, the second vertical conveyance roller pair 123 and the first vertical conveyance roller pair 122 convey the envelope E to the enclosing position determined based on the flap length. When the flap ef reaches a past position where the flap ef is past the first vertical conveyance roller pair 122, the second vertical conveyance roller pair 123 and the first vertical conveyance roller pair 122 interrupt rotation. Thus, the envelope E starts waiting for the enclosure to be inserted into the envelope E.

The standby position where the envelope E starts waiting for the enclosure is equivalent to the predetermined position (e.g., the enclosing position) where the enclosure is inserted into the envelope E. The folded sheet Sf serving as the enclosure is inserted into the envelope E halted at the predetermined position.

In a control in which the envelope processing controller 150 controls each conveyance roller pair to convey the envelope E to the predetermined position, after the separating roller pair 125 picks up the envelope E, the envelope processing controller 150 calculates a conveyance amount of the envelope E based on a rotation amount (e.g., a number of rotations) of each conveyance roller pair. The envelope processing controller 150 determines a position of the envelope E in the envelope conveyance path 1105 based on the conveyance amount of the envelope E and a length of the envelope entry path 1107 and the envelope conveyance path 1105.

Alternatively, after the flap detecting sensor 170 depicted in FIG. 6A detects the leading end of the envelope E (e.g., the leading end of the flap ef in the open state in which the flap ef opens) in the envelope conveyance direction DE (e.g., the positive Z-direction), the envelope E may be conveyed in the envelope conveyance direction DE for a distance corresponding to the flap length that is calculated. In this case, the mouth Ip of the envelope E is conveyed to the predetermined enclosing position more precisely.

Figure 12:
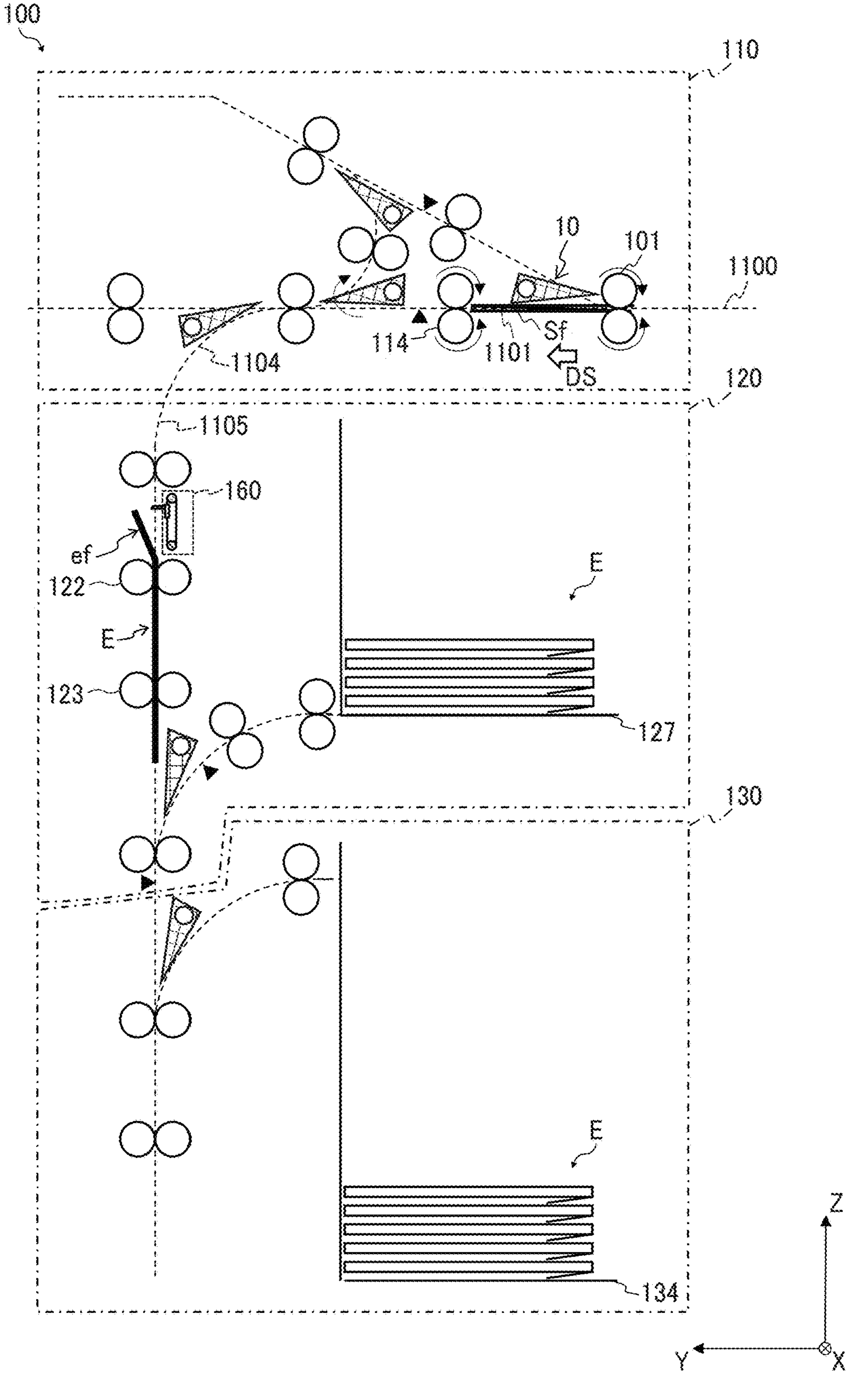
FIG. 12 is a cross-sectional view of the envelope processing apparatus depicted in FIG. 3, illustrating yet another process for enclosing performed by the envelope processing apparatus.

As illustrated in FIG. 12, in a state in which the first vertical conveyance roller pair 122 and the second vertical conveyance roller pair 123 hold the envelope E at the enclosing position, the entry roller pair 101 of the envelope processing apparatus 100 receives the folded sheet Sf ejected from the upstream apparatus (e.g., the folding apparatus 300) disposed upstream from the envelope processing apparatus 100 in the sheet conveyance direction DS. The entry roller pair 101 conveys the folded sheet Sf to the first conveyance path 1101.

Figure 13:
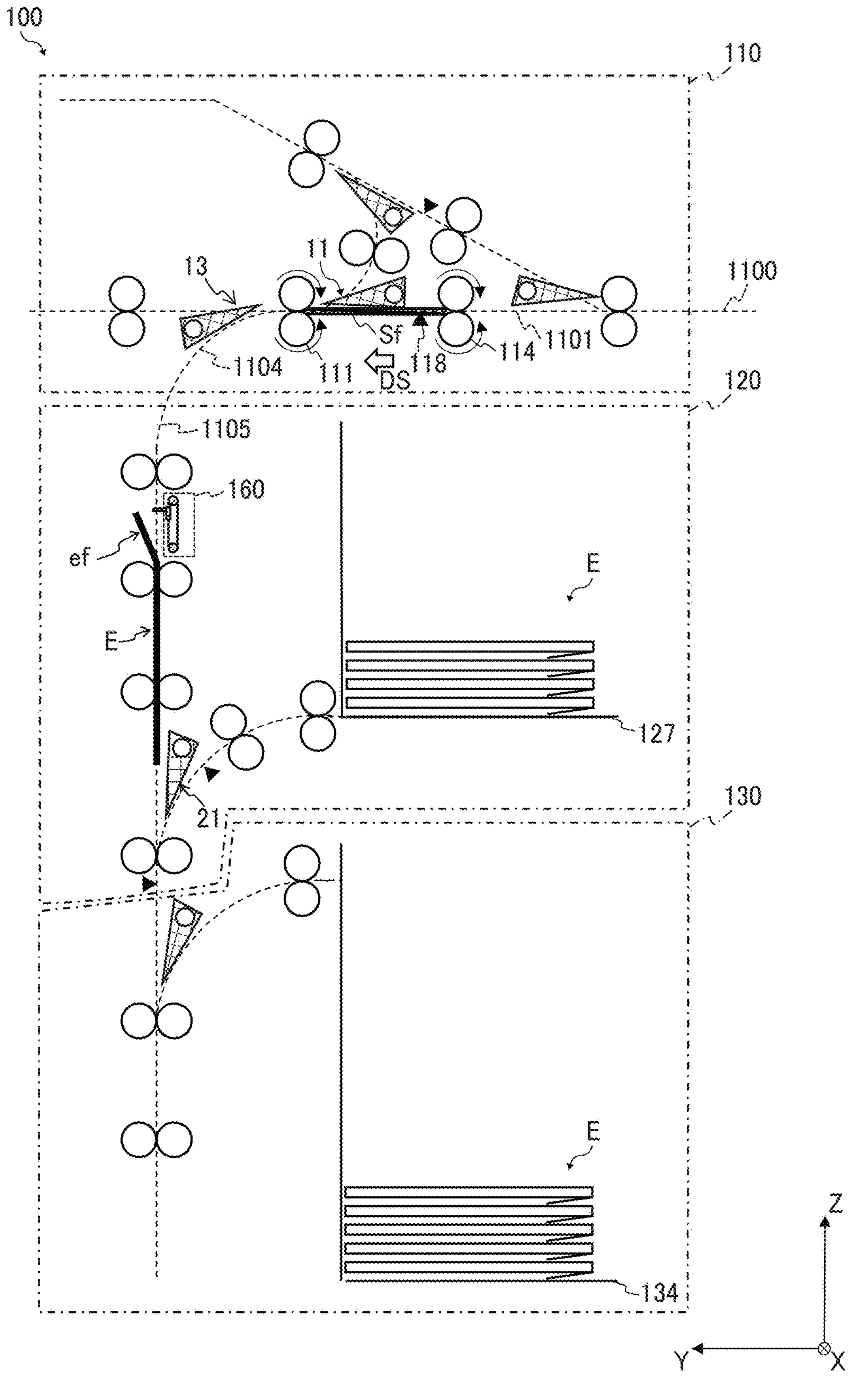
FIG. 13 is a cross-sectional view of the envelope processing apparatus depicted in FIG. 3, illustrating yet another process for enclosing performed by the envelope processing apparatus.

Subsequently, as illustrated in FIG. 13, the first intermediate conveyance roller pair 114 and the first conveyance roller pair 111 convey the folded sheet Sf downstream in the sheet conveyance direction DS. The first switching pawl 11 and the third switching pawl 13 are positioned as illustrated in FIG. 13, guiding the folded sheet Sf from the first conveyance path 1101 to the enclosing conveyance path 1104.

Figure 14:
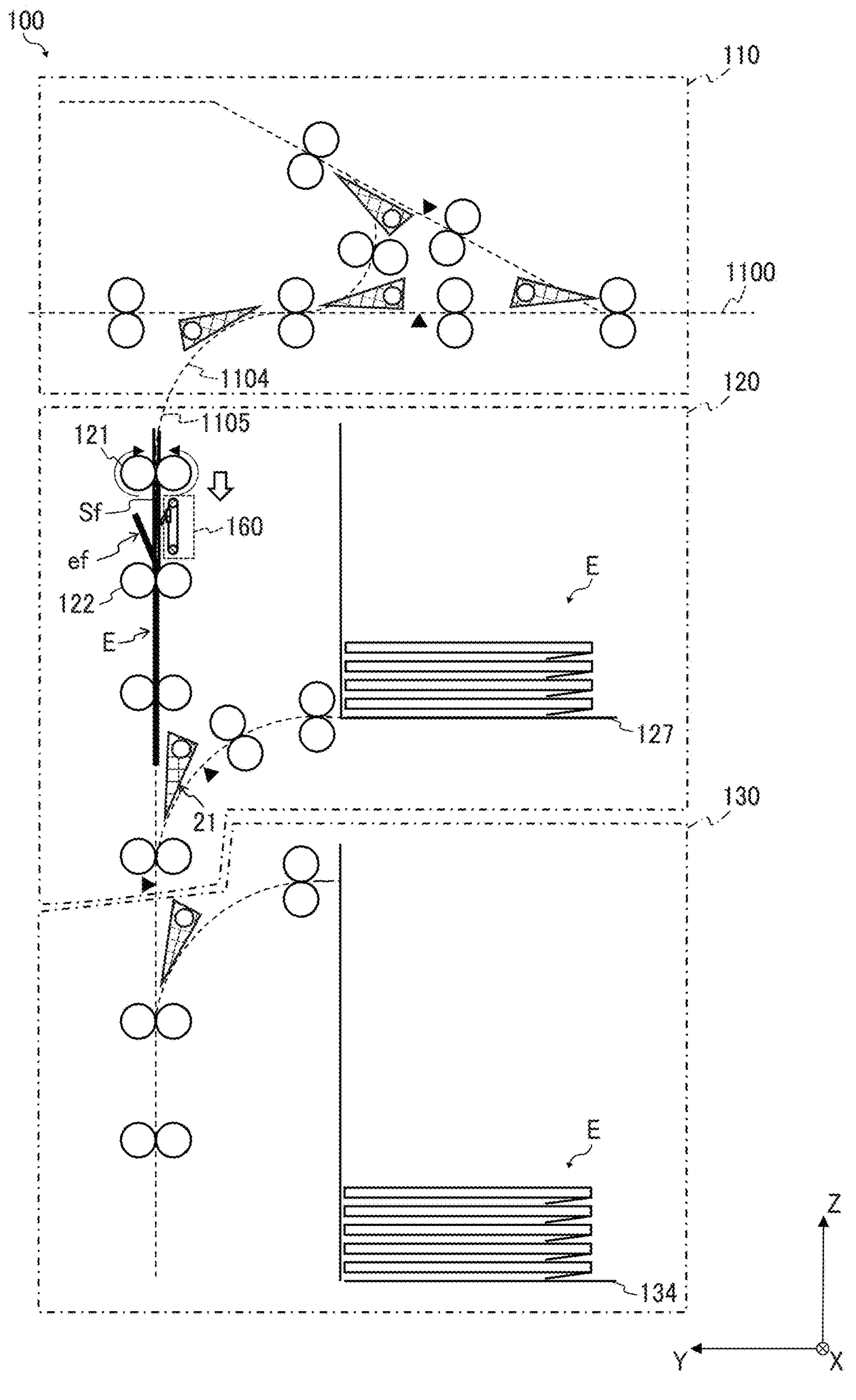
FIG. 14 is a cross-sectional view of the envelope processing apparatus depicted in FIG. 3, illustrating yet another process for enclosing performed by the envelope processing apparatus.

Thereafter, as illustrated in FIG. 14, the enclosing roller pair 121 conveys the folded sheet Sf conveyed from the enclosing conveyance path 1104 to the envelope conveyance path 1105 farther downward. As a result, the first vertical conveyance roller pair 122 and the like hold the folded sheet Sf at the predetermined enclosing position in the envelope conveyance path 1105. The folded sheet Sf is inserted into the envelope E through the mouth Ip that is opened. For example, as illustrated in FIGS. 6A and 6B, the pressing pawl 161 of the enclosure presser 160 presses the folded sheet Sf into the envelope E.

Figure 15:
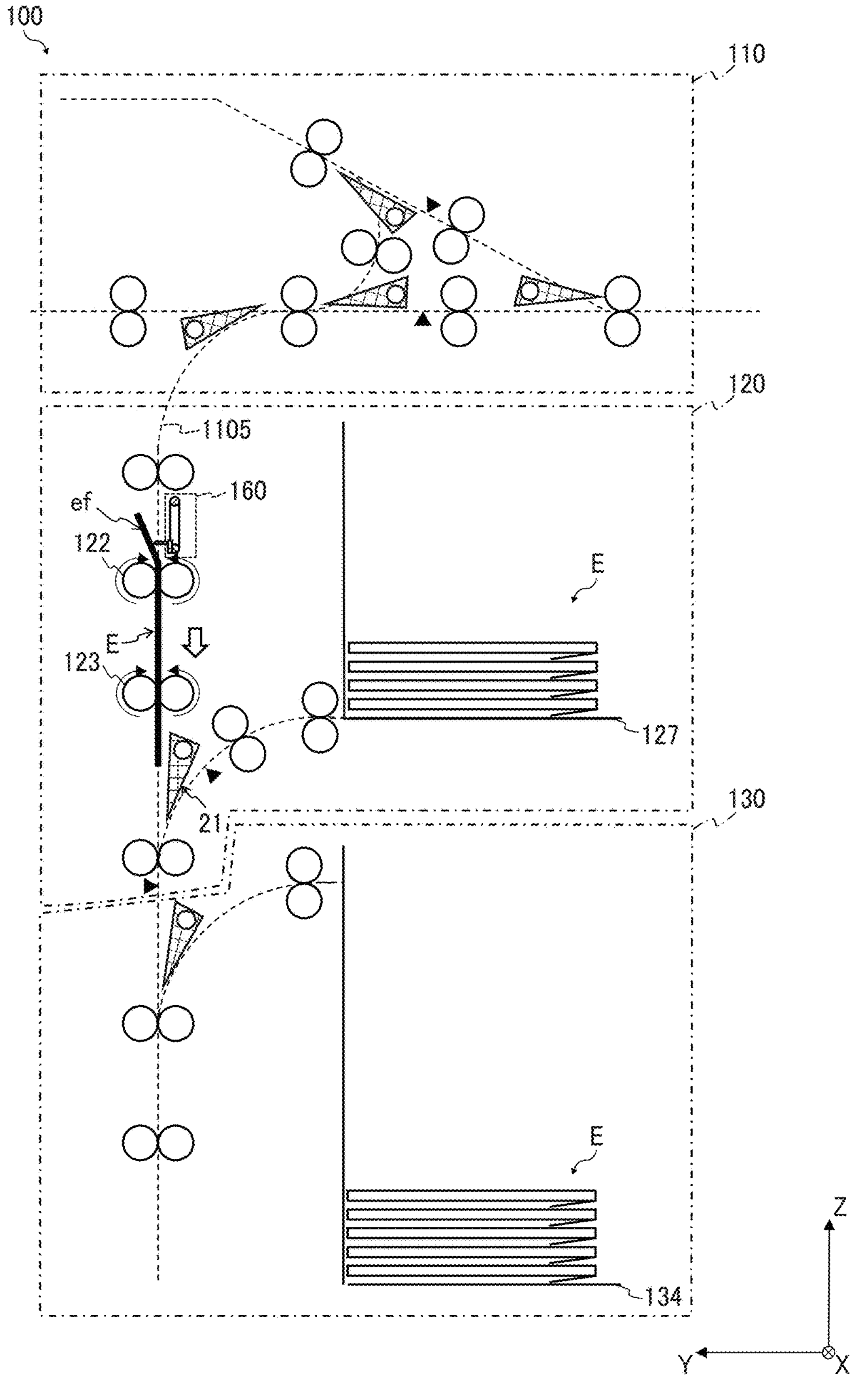
FIG. 15 is a cross-sectional view of the envelope processing apparatus depicted in FIG. 3, illustrating yet another process for enclosing performed by the envelope processing apparatus.
Figure 16:
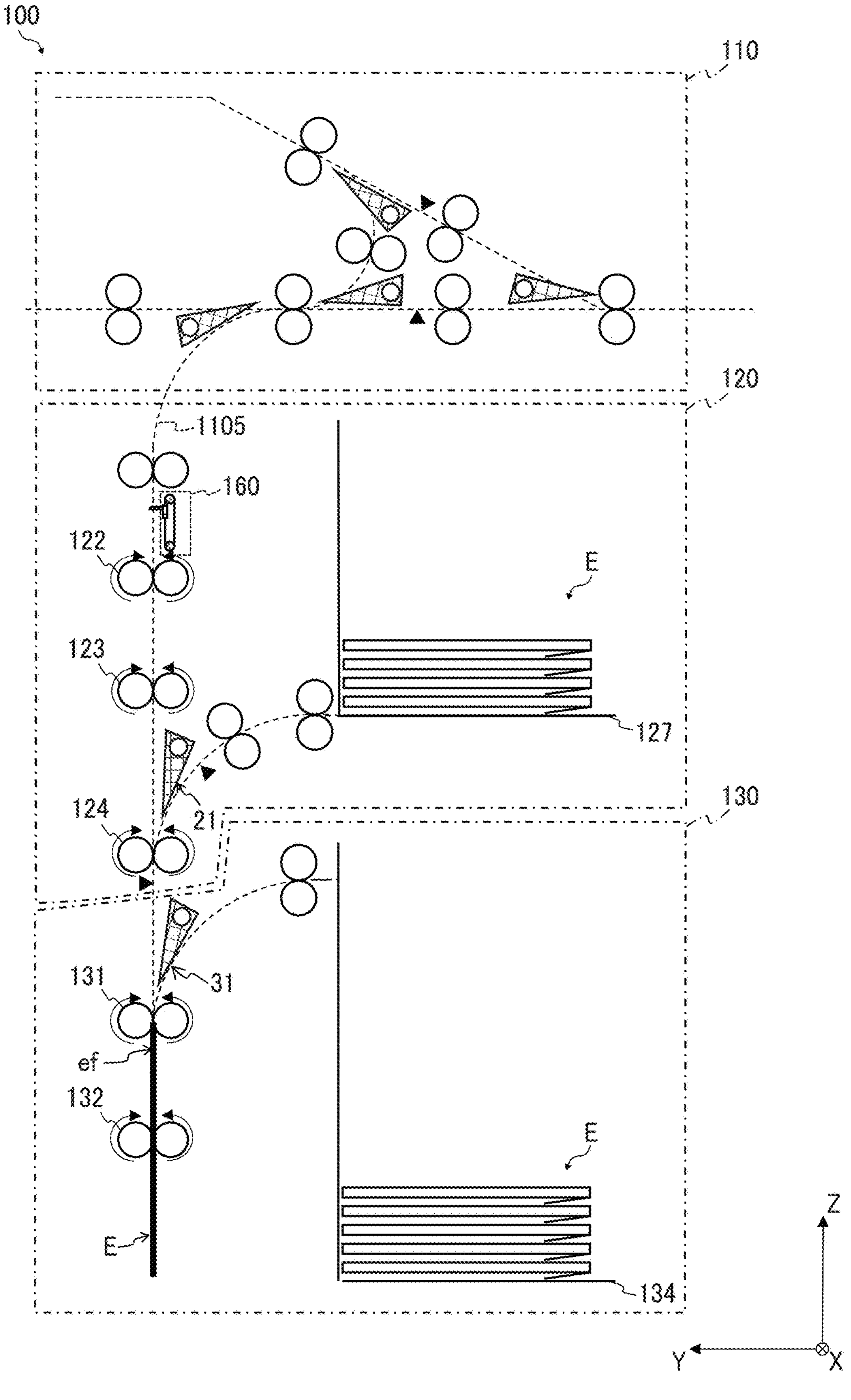
FIG. 16 is a cross-sectional view of the envelope processing apparatus depicted in FIG. 3, illustrating yet another process for enclosing performed by the envelope processing apparatus.

Subsequently, as illustrated in FIG. 15, the first vertical conveyance roller pair 122 and the second vertical conveyance roller pair 123 rotate, conveying the envelope E downward to the fourth vertical conveyance roller pair 132 as illustrated in FIG. 16. The envelope E enclosed with the folded sheet Sf is conveyed to a past position where the flap ef is past the envelope ejecting switching pawl 31.

Figure 17:
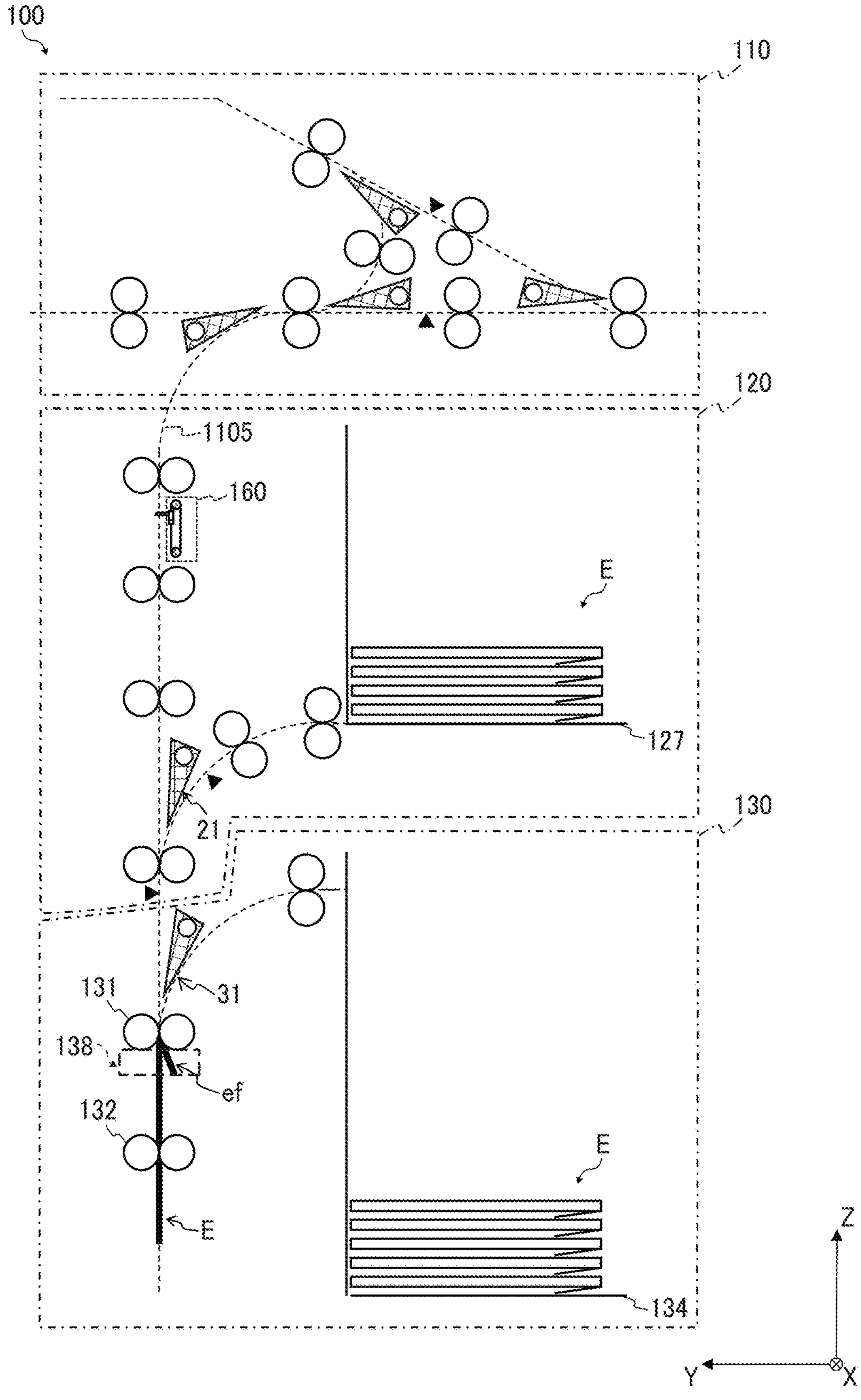
FIG. 17 is a cross-sectional view of the envelope processing apparatus depicted in FIG. 3, illustrating yet another process for enclosing performed by the envelope processing apparatus.

Thereafter, as illustrated in FIG. 17, a sealer 138 closes the flap ef, sealing the envelope E at a position interposed between the third vertical conveyance roller pair 131 and the fourth vertical conveyance roller pair 132.

Figure 18:
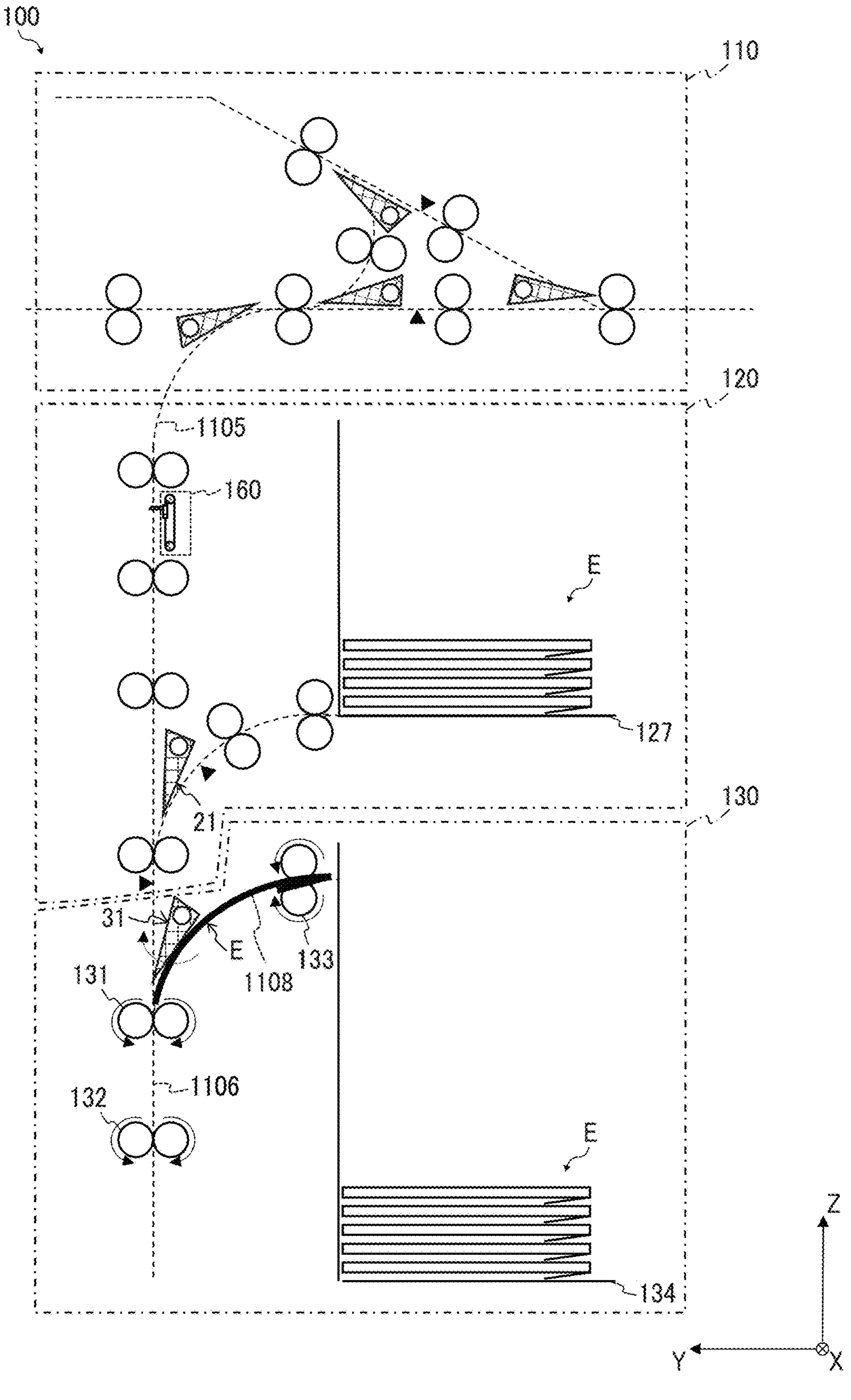
FIG. 18 is a cross-sectional view of the envelope processing apparatus depicted in FIG. 3, illustrating yet another process for enclosing performed by the envelope processing apparatus.

Thereafter, as illustrated in FIG. 18, the third vertical conveyance roller pair 131 and the fourth vertical conveyance roller pair 132 rotate backward, switching back and conveying the sealed envelope E. Before the third vertical conveyance roller pair 131 and the fourth vertical conveyance roller pair 132 rotate backward, the envelope ejecting switching pawl 31 pivots to a position depicted in FIG. 18. Accordingly, the third vertical conveyance roller pair 131 and the fourth vertical conveyance roller pair 132 convey the envelope E enclosed with the folded sheet Sf from the sealing path 1106 to the envelope ejecting path 1108.

Figure 19:
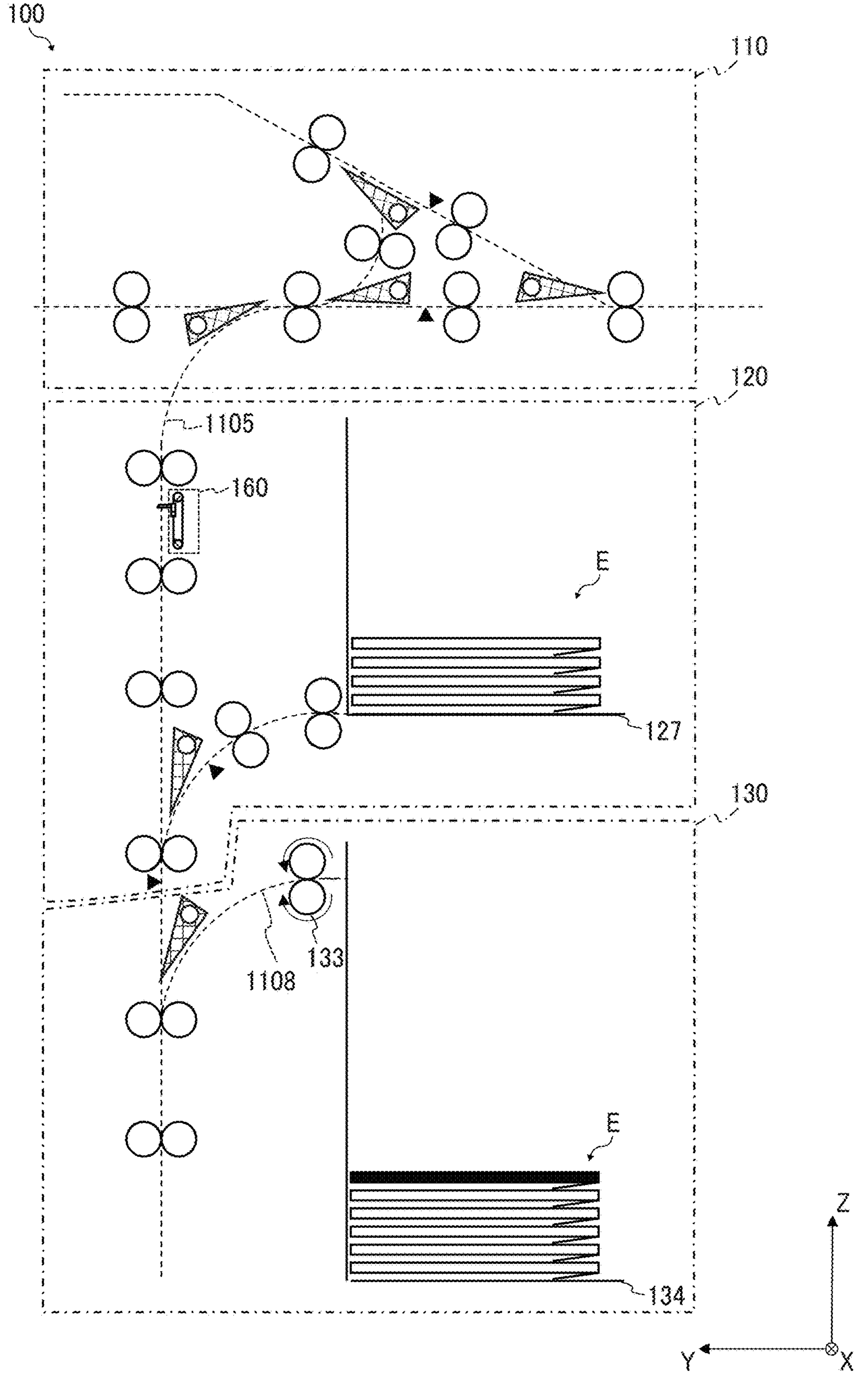
FIG. 19 is a cross-sectional view of the envelope processing apparatus depicted in FIG. 3, illustrating yet another process for enclosing performed by the envelope processing apparatus.

Consequently, as illustrated in FIG. 19, the envelope ejecting roller pair 133 ejects the sealed envelope E onto the envelope ejection tray 134.

A description is provided of a configuration of a comparative flap opener that opens a flap of an envelope while restricting motion of a body of the envelope regardless of a position of the flap in an envelope conveyance direction of the envelope so as to enclose an enclosure into the envelope.

The comparative flap opener presets a flap length of the flap of the envelope before an operation based on the flap length of the flap. Hence, the comparative flap opener performs controls that vary depending on various types of envelopes with difficulty. If the comparative flap opener includes a determination mechanism that determines the flap length of the flap of the envelope and the orientation of the envelope with respect to the envelope conveyance direction, the comparative flap opener copes with various types of envelopes. However, the comparative flap opener may incorporate a line sensor or the like, upsizing a construction that detects the envelope.

To address this circumstance, the envelope processing apparatus 100 according to embodiments of the present disclosure controls enclosing according to various types of envelopes.

A description is provided of a configuration of the envelope processing controller 150 according to a first embodiment of the present disclosure.

Figure 20A:
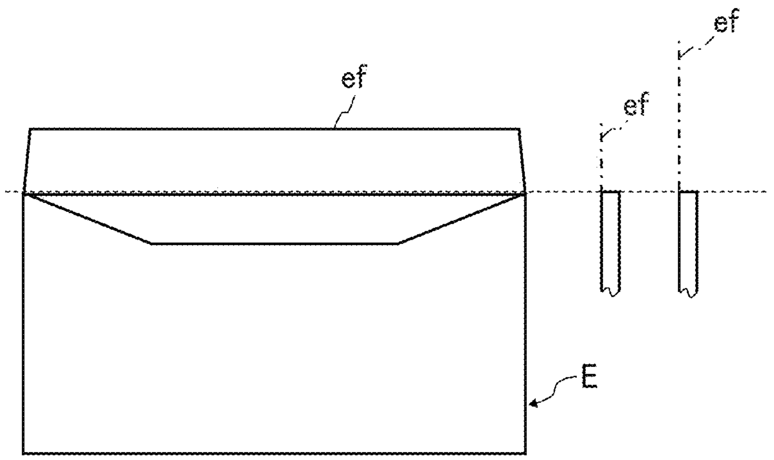
FIG. 20A is a diagram of an envelope, illustrating one example of sealing performed by the envelope processing apparatus depicted in FIG. 3.

For example, as illustrated in FIG. 20A, the envelope processing controller 150 controls the sealing device 130 to fold the flap ef along a bottom of the flap ef precisely based on the calculated flap length, thus sealing the envelope E. That is, the envelope processing apparatus 100 changes sealing of the envelope E, that is performed by the sealer 138 based on the flap length.

Figure 20B:
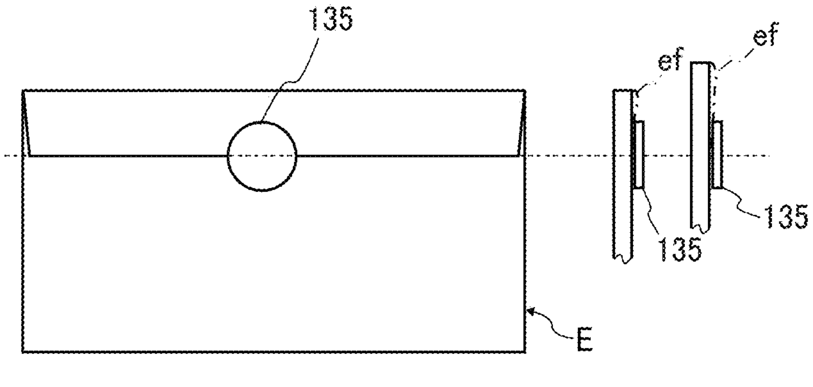
FIG. 20B is a diagram of the envelope, illustrating another example of sealing performed by the envelope processing apparatus depicted in FIG. 3.

As illustrated in FIG. 20B, since the flap ef is folded based on the calculated flap length, the envelope processing controller 150 determines a position on the envelope E where an edge of the flap ef is situated. Accordingly, the envelope processing controller 150 also controls the sealer 138 to affix an adhesive 135 used for sealing on the edge of the flap ef. For example, the envelope processing apparatus 100 changes the sealing position of the envelope E according to the flap length.

A description is provided of a configuration of the folding controller 320 according to a second embodiment of the present disclosure.

The folding controller 320 controls folding of the sheet S based on the envelope length and the flap length that are calculated by and notified from the envelope processing controller 150. Thus, the folding controller 320 controls the sheet folder 310 to produce the folded sheets Sf that have various folding positions corresponding to various envelope lengths and flap lengths. Accordingly, the folding controller 320 changes a type of folding and the like so that a dimension of the folded sheet Sf in the sheet conveyance direction DS (e.g., the enclosing direction) fits a length of the envelope E.

Figure 21A:
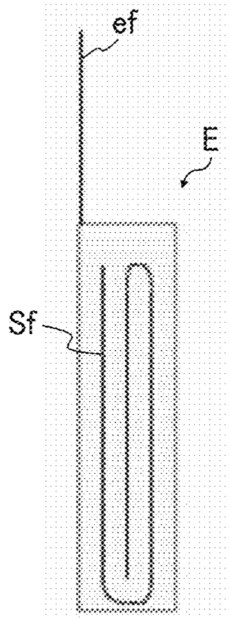
FIG. 21A is a diagram of the envelope and a folded sheet folded by a folding apparatus depicted in FIG. 2A that is interlocked with the envelope processing apparatus depicted in FIG. 3, illustrating one example of a relation between the folded sheet and sealing performed by the envelope processing apparatus.
Figure 21B:
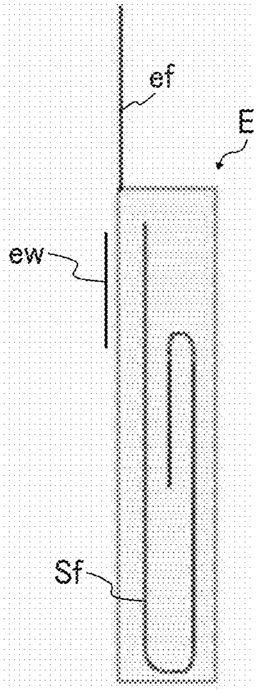
FIG. 21B is a diagram of the envelope and the folded sheet depicted in FIG. 21A, illustrating another example of the relation between the folded sheet and sealing.

For example, as illustrated in FIGS. 21A, 21B, 21C, and 21D, the folding controller 320 controls the sheet folder 310 to change a folding shape (e.g., a type of folding) of the folded sheet Sf based on the envelope length notified from the envelope processing controller 150 so that the folding shape fits an enclosure shape of the folded sheet Sf enclosed in the envelope E. FIG. 21A illustrates the folding shape and the enclosure shape of the folded sheet Sf in a normal mode. Conversely, FIG. 21B illustrates the enclosure shape of the folded sheet Sf in an address priority mode. FIG. 21B illustrates an example of adjustment in the folding position of the folded sheet Sf such that an address on the folded sheet Sf faces an address window (e.g., the transparent window ew) of the envelope E.

Figure 21C:
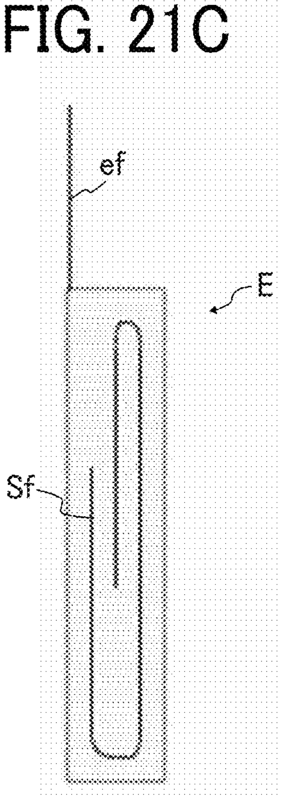
FIG. 21C is a diagram of the envelope and the folded sheet depicted in FIG. 21A, illustrating yet another example of the relation between the folded sheet and sealing.

FIG. 21C illustrates the enclosure shape of the folded sheet Sf in an envelope length priority mode. FIG. 21C illustrates an example of adjustment in the folding position of the folded sheet Sf such that a length of the folded sheet Sf fits a length of the envelope E in the envelope conveyance direction DE. Since the length of the envelope E in the envelope conveyance direction DE, that is available in the print system 1, is limited, the envelope length priority mode adjusts the folding position of the folded sheet Sf to address limitation in the length of the envelope E.

Figure 21D:
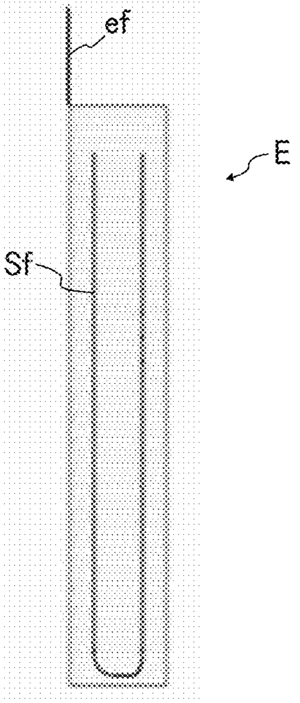
FIG. 21D is a diagram of the envelope and the folded sheet depicted in FIG. 21A, illustrating yet another example of the relation between the folded sheet and sealing.

FIG. 21D illustrates the enclosure shape of the folded sheet Sf in a half-fold mode. FIG. 21D illustrates an example of the half-fold mode set by the user in which a dimension (e.g., a folded length) of the folded sheet Sf produced by folding the sheet S in half is shorter than the envelope length of the envelope E.

A description is provided of a configuration of the envelope processing controller 150 according to a third embodiment of the present disclosure.

Using the envelope length and the flap length that are calculated by and notified from the envelope processing controller 150, the post-processing controller 420 performs post-processing based on the envelope length of the envelope E and the flap length of the flap ef. As the envelope processing controller 150 notifies the post-processing controller 420 of the flap length and the like, the envelope processing controller 150 controls the sheet reverse device 110 to eject the envelope E enclosed with the enclosure to the post-processing apparatus 400.

Figure 22A:
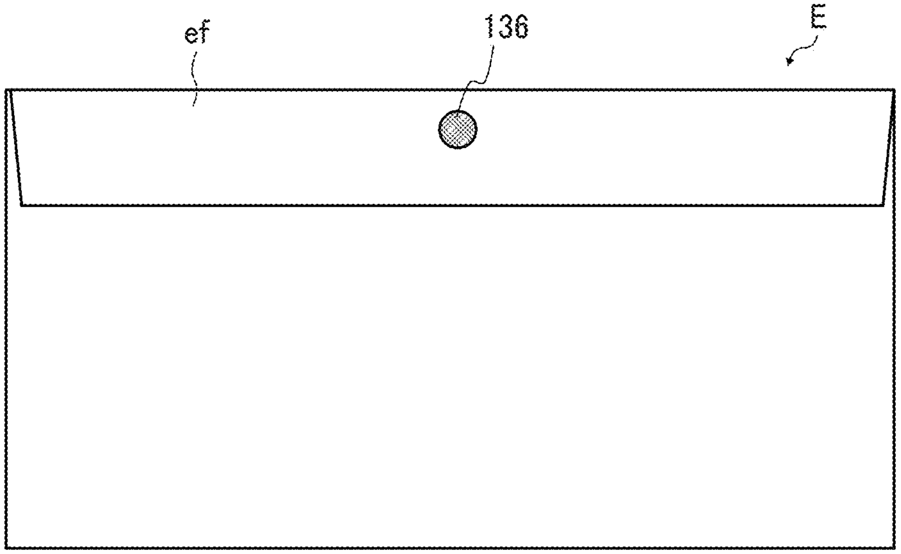
FIG. 22A is a diagram of the envelope and a hole produced by a post-processing apparatus depicted in FIG. 2A that is interlocked with the envelope processing apparatus depicted in FIG. 3, illustrating one example of a relation between the hole and sealing performed by the envelope processing apparatus.
Figure 22B:
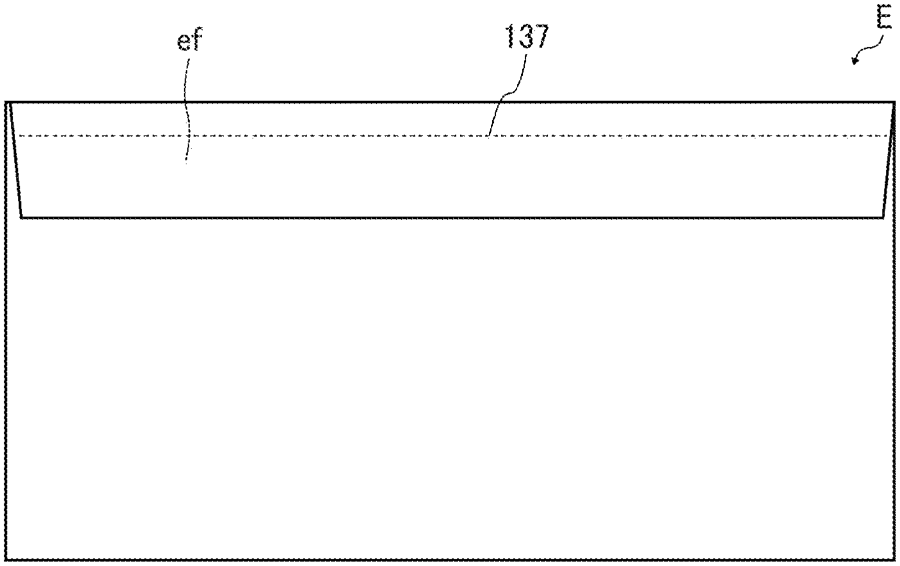
FIG. 22B is a diagram of the envelope and a needleless binder produced by the post-processing apparatus interlocked with the envelope processing apparatus depicted in FIG. 3, illustrating an example of a relation between the needleless binder and sealing performed by the envelope processing apparatus.

For example, as illustrated in FIG. 22A, the post-processing device 410 punches a hole in the flap ef at a predetermined position determined based on the flap length, producing a hole 136. Thus, the post-processing device 410 performs sealing based on the flap length. As illustrated in FIG. 22B, the post-processing device 410 produces a needleless binder 137 on the flap ef at a predetermined position determined based on the flap length. Thus, the post-processing device 410 performs sealing with binding based on the flap length. Alternatively, the post-processing device 410 may perform binding with needle at a predetermined position determined based on the flap length. Thus, the post-processing device 410 seals the envelope E at a position specified by the user.

According to the embodiments described above, when the enclosure is inserted into the envelope E, a contact portion of the enclosure presser 160, that contacts and presses the enclosure, is improved. Accordingly, the envelope processing apparatus 100 encloses the enclosure into the envelope E precisely, preventing the enclosure from being wound or bent. Consequently, the envelope processing apparatus 100 presses and inserts the enclosure into the envelope E properly without damaging the enclosure.

The technology of the present disclosure is not limited to the embodiments described above. The embodiments of the present disclosure may be modified variously within the scope of the present disclosure. The technology of the present disclosure includes technical matters encompassed by a technological concept within the scope of the present disclosure. Although the embodiments described above disclose preferable examples, the embodiments may be modified into modification examples by those skilled in the art based on the present disclosure. The modification examples are also encompassed by the technological concept within the scope of the present disclosure.

A description is provided of advantages of an envelope processing apparatus (e.g., the envelope processing apparatus 100).

As illustrated in FIGS. 2A, 2B, 3, and 4, the envelope processing apparatus according to an embodiment encloses an enclosure (e.g., the sheet S or the folded sheet Sf) into an envelope (e.g., the envelope E) conveyed to an enclosing position. The envelope processing apparatus includes a conveyance roller (e.g., the first vertical conveyance roller pair 122 and the flap opening roller pair 124), an envelope conveyance path (e.g., the envelope conveyance path 1105), a first envelope length calculator (e.g., the first envelope length calculator 1501), a flap opener (e.g., the flap opener 180), a second envelope length calculator (e.g., the second envelope length calculator 1502), and a controller (e.g., the flap length calculator 1503 or the envelope processing controller 150).

The conveyance roller conveys the envelope to the enclosing position through the envelope conveyance path. The first envelope length calculator calculates a first envelope length of the envelope in an envelope conveyance direction (e.g., the envelope conveyance direction DE) in a close state in which a flap (e.g., the flap ef) of the envelope closes. The flap opener opens the flap while the conveyance roller conveys the envelope through the envelope conveyance path. The second envelope length calculator calculates the second envelope length of the envelope in the envelope conveyance direction in an open state in which the flap opens. The controller controls enclosing of the enclosure into the envelope. The controller calculates a flap length of the flap in the envelope conveyance direction based on the first envelope length and the second envelope length and controls enclosing of the enclosure into the envelope based on the flap length.

Accordingly, the envelope processing apparatus is downsized and controls enclosing of the enclosure into envelopes of various types.

The image forming apparatus 200 may be a copier, a printer, a facsimile machine, a multifunction peripheral (MFP) having at least two of copying, printing, scanning, facsimile, and plotter functions, an inkjet recording apparatus, or the like.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An envelope processing apparatus for enclosing an enclosure into an envelope conveyed to an enclosing position, the envelope processing apparatus comprising:
- a conveyance roller configured to convey the envelope to the enclosing position;
- a first envelope length calculator configured to,
  - calculate a first envelope length of the envelope in an envelope conveyance direction in which the envelope is conveyed in a close state in which a flap of the envelope closes;
- a flap opener configured to open the flap while the conveyance roller conveys the envelope;
- a second envelope length calculator configured to calculate a second envelope length of the envelope in the envelope conveyance direction in an open state in which the flap opens;
- a first envelope detector configured to detect a leading end of the envelope in the envelope conveyance direction at a first detection time and detect a trailing end of the envelope in the envelope conveyance direction in the close state at the second detection time;
- a second envelope detector configured to detect the leading end of the envelope in the envelope conveyance direction at a third detection time and detect the trailing end of the envelope in the envelope conveyance direction in the open state at a fourth detection time;
- the first envelope length calculator is further configured to calculate the first envelope length based on a time difference between the first detection time and the second detection time and a conveyance speed of the envelope at which the envelope is conveyed;
- the second envelope length calculator is further configured to calculate the second envelope length based on a time difference between the third detection time and the fourth detection time and the conveyance speed of the envelope; and
- a controller configured to,
  - calculate a flap length of the flap in the envelope conveyance direction based on the first envelope length and the second envelope length,
  - control enclosing of the enclosure into the envelope based on the flap length, and
  - control the conveyance roller to interrupt conveyance of the envelope at the enclosing position.

2. The envelope processing apparatus according to claim 1, further comprising:
- an envelope conveyance path through which the envelope is conveyed to the enclosing position,
- wherein the flap opener is in the envelope conveyance path.

3. The envelope processing apparatus according to claim 1, wherein each of the first envelope detector and the second envelope detector includes a sensor.

4. The envelope processing apparatus according to claim 1, further comprising:
- a flap holder configured to detect and hold the flap of the envelope.

5. The envelope processing apparatus according to claim 4, wherein the controller is further configured to
- determine the enclosing position based on a detection result sent from the flap holder and the flap length; and
- control the conveyance roller to convey the envelope to the enclosing position.

6. The envelope processing apparatus according to claim 4, wherein the flap holder includes:
- a flap detecting sensor configured to detect the flap; and
- a flap holding roller configured to hold the flap.

7. The envelope processing apparatus according to claim 1, further comprising
- a sealer configured to close the flap of the envelope enclosed with the enclosure so as to seal the envelope.

8. The envelope processing apparatus according to claim 7, wherein the controller is further configured to:
- change a sealing position where the sealer seals the envelope based on the flap length.

9. An image forming system comprising:
- an image forming apparatus configured to form an image on a medium; and
- an envelope processing apparatus configured to enclose the medium sent from the image forming apparatus into an envelope conveyed to an enclosing position,
- the envelope processing apparatus comprising,
  - a conveyance roller configured to convey the envelope to the enclosing position,
  - a first envelope length calculator configured to calculate a first envelope length of the envelope in an envelope conveyance direction in which the envelope is conveyed in a close state in which a flap of the envelope closes,
  - a flap opener configured to open the flap while the conveyance roller conveys the envelope,
  - a second envelope length calculator configured to calculate a second envelope length of the envelope in the envelope conveyance direction in an open state in which the flap opens,
  - a first envelope detector configured to detect a leading end of the envelope in the envelope conveyance direction at a first detection time and detect a trailing end of the envelope in the envelope conveyance direction in the close state at a second detection time,
  - a second envelope detector configured to detect the leading end of the envelope in the envelope conveyance direction at a third detection time and detect the trailing end of the envelope in the envelope conveyance direction in the open state at a fourth detection time,
  - the first envelope length calculator is further configured to calculate the first envelope length based on a time difference between the first detection time and the second detection time and a conveyance speed of the envelope at which the envelope is conveyed,
  - the second envelope length calculator is further configured to calculate the second envelope length based on a time difference between the third detection time and the fourth detection time and the conveyance speed of the envelope, and a controller configured to, calculate a flap length of the flap in the envelope conveyance direction based on the first envelope length and the second envelope length, and control enclosing of the medium into the envelope based on the flap length.

10. The image forming system according to claim 9, wherein the medium includes a sheet.

11. The image forming system according to claim 9, further comprising:

a folding apparatus configured to fold the medium bearing the image and send the folded medium to the envelope processing apparatus.

12. The image forming system according to claim 11, wherein the folding apparatus is further configured to:

change a folding position on the medium based on at least one of the first envelope length and the second envelope length and the flap length.

13. The image forming system according to claim 11, wherein the folding apparatus is further configured to:

change a type of folding based on at least one of the first envelope length and the second envelope length.

14. The image forming system according to claim 9, further comprising:

a post-processing apparatus configured to, perform post-processing on the envelope enclosed with the medium, and change a post-processing position on the flap based on the flap length.

15. The image forming system according to claim 14, wherein the post-processing includes punching the flap.

16. The image forming system according to claim 14, wherein the post-processing includes binding the flap.

17. The image forming system according to claim 9, further comprising:

an envelope conveyance path through which the envelope is conveyed to the enclosing position, wherein the flap opener is in the envelope conveyance path.

18. The image forming system according to claim 9, wherein each of the first envelope detector and the second envelope detector includes a sensor.

19. The image forming system according to claim 9, further comprising:

a flap holder configured to detect and hold the flap of the envelope.

20. The image forming system according to claim 19, wherein the controller is further configured to:

determine the enclosing position based on a detection result sent from the flap holder and the flap length; and control the conveyance roller to convey the envelope to the enclosing position.

* * * * *